United States Patent
Shrivastava et al.

(10) Patent No.: US 10,935,864 B2
(45) Date of Patent: Mar. 2, 2021

(54) METHOD OF COMMISSIONING ELECTROCHROMIC WINDOWS

(71) Applicant: View, Inc., Milpitas, CA (US)

(72) Inventors: Dhairya Shrivastava, Los Altos, CA (US); Alexander Rumer, Santa Clara, CA (US); Anshu A. Pradhan, Collierville, TN (US)

(73) Assignee: View, Inc., Milpitas, CA (US)

( * ) Notice: Subject to any disclaimer, the term of this patent is extended or adjusted under 35 U.S.C. 154(b) by 277 days.

(21) Appl. No.: 16/082,793

(22) PCT Filed: Mar. 3, 2017

(86) PCT No.: PCT/US2017/020805
§ 371 (c)(1),
(2) Date: Sep. 6, 2018

(87) PCT Pub. No.: WO2017/155833
PCT Pub. Date: Sep. 14, 2017

(65) Prior Publication Data
US 2020/0310213 A1    Oct. 1, 2020

Related U.S. Application Data

(60) Provisional application No. 62/305,892, filed on Mar. 9, 2016, provisional application No. 62/370,174, filed on Aug. 2, 2016.

(51) Int. Cl.
*G02F 1/00* (2006.01)
*G02F 1/163* (2006.01)
*E06B 9/24* (2006.01)

(52) U.S. Cl.
CPC ............... *G02F 1/163* (2013.01); *E06B 9/24* (2013.01); *E06B 2009/2464* (2013.01)

(58) Field of Classification Search
CPC .. G02F 1/163; G02F 1/157; G02F 2001/1635; E06B 9/24; E06B 2009/2464
(Continued)

(56) References Cited

U.S. PATENT DOCUMENTS 7,610,910 B2    11/2009    Ahmed
7,966,078 B2     6/2011    Hoffberg et al.
(Continued)

FOREIGN PATENT DOCUMENTS

CN    1808505 A    7/2006
CN    101013211 A   8/2007
(Continued)

OTHER PUBLICATIONS

U.S. Appl. No. 62/102,515, filed Jan. 12, 2015, Nagar et al.
(Continued)

*Primary Examiner* — William R Alexander
*Assistant Examiner* — Henry A Duong
(74) *Attorney, Agent, or Firm* — Weaver Austin Villeneuve and Sampson LLP; Brian D. Griedel

(57) ABSTRACT

Networks of electrochromic windows and methods of commissioning the windows on such networks are described. The commissioning may involve determining where each electrochromic window is installed and/or which controller is associated with which electrochromic window. In various cases, a number of windows may be simultaneously commissioned.

24 Claims, 11 Drawing Sheets

(58) Field of Classification Search
USPC .......................................................... 359/275
See application file for complete search history.

(56) References Cited

U.S. PATENT DOCUMENTS

| | | | |
|---|---|---|---|
| 8,024,073 B2 | 9/2011 | Imes et al. | |
| 8,214,494 B1 | 7/2012 | Slavin | |
| 8,509,400 B2 | 8/2013 | Liu et al. | |
| 8,705,162 B2 | 4/2014 | Brown et al. | |
| 9,470,947 B2 | 10/2016 | Nagel et al. | |
| 9,546,515 B2 | 1/2017 | Hall et al. | |
| 10,365,531 B2 | 7/2019 | Shrivastava et al. | |
| 2002/0113168 A1 | 8/2002 | Rukavina et al. | |
| 2002/0152298 A1 | 10/2002 | Kikta et al. | |
| 2005/0063036 A1 | 3/2005 | Bechtel et al. | |
| 2005/0200937 A1 | 9/2005 | Weidner | |
| 2006/0001683 A1 | 1/2006 | May et al. | |
| 2007/0053053 A1 | 3/2007 | Moskowitz | |
| 2007/0067048 A1 | 3/2007 | Bechtel et al. | |
| 2007/0097484 A1 | 5/2007 | Libretto et al. | |
| 2008/0018979 A1 | 1/2008 | Mahe et al. | |
| 2009/0257576 A1 | 10/2009 | Wellard et al. | |
| 2010/0066484 A1 | 3/2010 | Hanwright et al. | |
| 2010/0172009 A1 | 7/2010 | Matthews | |
| 2011/0148218 A1 | 6/2011 | Rozbicki | |
| 2011/0184561 A1 | 7/2011 | Klasson et al. | |
| 2012/0062975 A1 | 3/2012 | Mehtani et al. | |
| 2012/0232969 A1 | 9/2012 | Fadell et al. | |
| 2012/0293855 A1* | 11/2012 | Shrivastava ............... | E06B 9/24 359/275 |
| 2013/0085614 A1 | 4/2013 | Wenzel et al. | |
| 2013/0271812 A1 | 10/2013 | Brown et al. | |
| 2013/0271814 A1 | 10/2013 | Brown | |
| 2013/0271815 A1 | 10/2013 | Brown et al. | |
| 2014/0108647 A1 | 4/2014 | Bleess et al. | |
| 2014/0236323 A1 | 8/2014 | Brown et al. | |
| 2014/0317514 A1 | 10/2014 | Bokotey | |
| 2015/0070745 A1 | 3/2015 | Pradhan | |
| 2015/0103389 A1 | 4/2015 | Klawuhn et al. | |
| 2015/0116811 A1 | 4/2015 | Shrivastava et al. | |
| 2016/0052446 A1 | 2/2016 | Frey et al. | |
| 2016/0054633 A1 | 2/2016 | Brown et al. | |
| 2016/0377948 A1 | 12/2016 | Rozbicki et al. | |
| 2017/0082903 A1 | 3/2017 | Vigano et al. | |
| 2018/0088432 A1 | 3/2018 | Shrivastava et al. | |
| 2019/0049811 A9 | 2/2019 | Shrivastava et al. | |
| 2019/0294018 A1 | 9/2019 | Shrivastava et al. | |
| 2020/0080364 A1 | 3/2020 | Shrivastava et al. | |

FOREIGN PATENT DOCUMENTS

| | | |
|---|---|---|
| CN | 101023711 A | 8/2007 |
| CN | 101213788 A | 7/2008 |
| CN | 103649826 | 3/2014 |
| CN | 104335595 A | 2/2015 |
| CN | 105143586 A | 12/2015 |
| EP | 0920210 A1 | 6/1999 |
| JP | 2004-505298 A | 2/2004 |
| RU | 2378672 C2 | 10/2010 |
| RU | 2009132962 A | 10/2010 |
| TW | 201351010 A | 12/2013 |
| TW | 201606409 A | 2/2016 |
| WO | WO02/09338 A2 | 1/2002 |
| WO | WO 02/13052 A2 | 2/2002 |
| WO | WO2009/042359 A1 | 4/2009 |
| WO | WO 2010/120771 | 10/2010 |
| WO | WO2013/090264 | 6/2013 |
| WO | WO 2015/134789 | 9/2015 |
| WO | WO 2015/168626 | 11/2015 |
| WO | WO2015/171886 A1 | 11/2015 |
| WO | WO2016/004109 A1 | 1/2016 |
| WO | WO 2016/094445 | 6/2016 |
| WO | WO2017/192881 | 11/2017 |
| WO | WO2018/098089 | 5/2018 |

OTHER PUBLICATIONS

U.S. Appl. No. 62/102,516, filed Jan. 12, 2015, Nagel et al.
U.S. Office Action dated Nov. 18, 2016 in U.S. Appl. No. 14/391,122.
U.S. Final Office Action dated Jul. 3, 2017 in U.S. Appl. No. 14/391,122.
U.S. Office Action dated Sep. 1, 2017 in U.S. Appl. No. 14/391,122.
U.S. Final Office Action dated Feb. 8, 2018 in U.S. Appl. No. 14/391,122.
European (extended) Search Report dated Dec. 4, 2015 in European Application No. 13775052.7.
International Search Report and Written Opinion dated Jul. 26, 2013, issued in PCT/US2013/036456.
International Preliminary Report on Patentability dated Oct. 23, 2014 issued in PCT/US2013/036456.
Russian Office Action dated Mar. 9, 2017 in RU Application No. 2014145565.
Chinese Office Action dated Jun. 21, 2017 in CN Application No. 201380025802.1.
Chinese Office Action dated Jan. 15, 2018 in CN Application No. 201380025802.1.
International Search Report and Written Opinion dated Jun. 5, 2017, issued in PCT/US17/20805.
Russian Office Action dated Dec. 12, 2014 issued in RU 2014145565.
European (extended) Search Report dated Aug. 25, 2017 in European Application No. 17156033.7.
U.S. Office Action dated Jun. 22, 2018 in U.S. Appl. No. 14/391,122.
U.S. Preliminary Amendment dated Jan. 23, 2020 in U.S. Appl. No. 16/469,848.
U.S. Final Office Action dated Nov. 20, 2018 in U.S. Appl. No. 14/391,122.
U.S. Notice of Allowance dated Mar. 11, 2019 in U.S. Appl. No. 14/391,122.
U.S. Office Action dated Oct. 11, 2019 in U.S. Appl. No. 15/727,258.
U.S. Final Office Action dated Feb. 5, 2020 in U.S. Appl. No. 15/727,258.
U.S. Office Action dated Jun. 6, 2020 in U.S. Appl. No. 15/727,258.
Chinese Office Action dated May 20, 2020 in CN Application No. 201810932986.4.
Indian Office Action dated Sep. 17, 2019 in Indian Application No. 2533/KOLNP/2014.
International Preliminary Report on Patentability dated Sep. 20, 2018, issued in PCT/US17/20805.
European (extended) Search Report dated Nov. 28, 2019 in European Application No. 17763804.6.
Chinese Office Action dated May 26, 2020 in CN Application No. 201780079165.4.
International Search Report and Written Opinion dated Apr. 13, 2018 for PCT/US2017/066486.
International Preliminary Report on Patentability dated Jun. 27, 2019 for PCT/US2017/066486.
Chinese Office Action dated May 26, 2020 for 201780082949.2.
US Notice of Allowance dated Dec. 11, 2020 in U.S. Appl. No. 15/727,258.
Chinese Office Action dated Nov. 23, 2020 in CN Application No. 201810932986.4.
European (Extended) Search Report dated Nov. 2, 2020 in European Application No. 17880595.8.
Taiwanese Office Action dated Nov. 25, 2020 in TW Application No. 106107498.

* cited by examiner

LOC ID:  East1      East2      East3      East4      East5
CAN ID: _____   _____   _____   _____   _____
LITE ID: _____  _____   _____   _____   _____

| NC₁ |
|---|
| CAN ID: XXXX1<br>LITE ID: YYYY1      LOC ID_____<br>•<br>•<br>•<br>•<br>•<br>•<br>•<br>CAN ID: XXXXm<br>LITE ID: YYYYm      LOC ID_____ |

*Fig. 2E*

| | | | | |
|---|---|---|---|---|
| | | | | |

LOC ID: East1　　East2　　East3　　East4　　East5
CAN ID: _____　_____　_____　_____　XXXX1
LITE ID: _____　_____　_____　_____　YYYY1

| NC₁ |
|---|
| CAN ID: XXXX1　　LOC ID: East 5<br>LITE ID: YYYY1<br>　　　•<br>　　　•<br>　　　•<br>　　　•<br>　　　•<br>　　　•<br>CAN ID: XXXXm　　LOC ID _____<br>LITE ID: YYYYm |

|   | A | B | C | D | E | F |
|---|---|---|---|---|---|---|
| 1 |   |   |   |   |   |   |
| 2 |   | Group 1 |   |   | Group 2 |   |
| 3 |   |   |   |   |   |   |
| 4 |   |   |   |   |   |   |
| 5 |   | Group 3 |   |   | Group 4 |   |
| 6 |   |   |   |   |   |   |

Full 6x6 façade divided into 4 3x3 groups

*Fig. 3C*

|   | A | B | C | D | E | F |
|---|---|---|---|---|---|---|
| 1 | 0 | 1 | 2 | 7 | 6 | 5 |
| 2 | 3 | 4 | 5 | 8 | 2 | 4 |
| 3 | 6 | 7 | 8 | 3 | 1 | 0 |
| 4 | 1 | 2 | 5 | 6 | 5 | 4 |
| 5 | 6 | 3 | 4 | 7 | 2 | 0 |
| 6 | 7 | 8 | 0 | 8 | 3 | 1 |

Pattern # from 0-8 assigned in each group

*Fig. 3D*

|   | A | B | C | D | E | F |
|---|---|---|---|---|---|---|
| 1 | 00 | 01 | 02 | 21 | 20 | 12 |
| 2 | 10 | 11 | 12 | 22 | 02 | 11 |
| 3 | 20 | 21 | 22 | 10 | 01 | 00 |
| 4 | 01 | 02 | 12 | 20 | 12 | 11 |
| 5 | 20 | 10 | 11 | 21 | 02 | 00 |
| 6 | 21 | 22 | 00 | 22 | 10 | 01 |

Pattern # converted to base 3

*Fig. 3E*

METHOD OF COMMISSIONING ELECTROCHROMIC WINDOWS

CROSS REFERENCE TO RELATED APPLICATIONS

This application claims priority to the following U.S. Provisional Patent Applications, each of which is herein incorporated by reference in its entirety and for all purposes: U.S. Provisional Patent Application No. 62/305,892, filed Mar. 9, 2016, and titled "METHOD OF COMMISSIONING ELECTROCHROMIC WINDOWS"; and U.S. Provisional Patent Application No. 62/370,174, filed Aug. 2, 2016, and titled "METHOD OF COMMISSIONING ELECTROCHROMIC WINDOWS."

FIELD

Various embodiments herein relate to electrochromic devices, more particularly to controllers and associated components, systems and networks for electrochromic windows, as well as methods for commissioning the electrochromic devices installed in such systems and networks.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance.

Electrochromic materials may be incorporated into, for example, windows for home, commercial and other uses as thin film coatings on the window glass. The color, transmittance, absorbance, and/or reflectance of such windows may be changed by inducing a change in the electrochromic material, for example, electrochromic windows are windows that can be darkened or lightened electronically. A small voltage applied to an electrochromic device (EC) of the window will cause them to darken; reversing the voltage polarity causes them to lighten. This capability allows control of the amount of light that passes through the windows, and presents an opportunity for electrochromic windows to be used as energy-saving devices.

SUMMARY

Various embodiments herein relate to methods for determining the relationships between electrochromic windows and their associated window controllers in a network of electrochromic windows. Advantageously, the described methods can be used to quickly associate electrochromic windows with their associated window controllers.

In one aspect of the disclosed embodiments, a method of determining associations between window controllers and associated electrochromic windows installed in a network is provide3d, the method including: (a) providing instructions to each window controller to simultaneously transition its associated electrochromic window(s) to a commissioning state, where the commissioning states vary between electrochromic windows associated with different window controllers; (b) after (a), recording the commissioning states of the electrochromic windows; (c) repeating (a) and (b) at least once such that each electrochromic window experiences a series of commissioning states, where the instructions provided to the window controllers provide a unique series of commissioning states for each window controller being simultaneously commissioned; and (d) determining the association between the window controllers and their associated electrochromic windows by comparing the instructions provided in each iteration of (a) with the commissioning states observed in each iteration of (b).

In some implementations, the commissioning states may include three or more different tint states. In some such implementations, the commissioning states may include four or more different tint states. The commissioning states may be static and/or transitory. In one example, the commissioning states may include two or more different static tint states and one or more transitory tint states. In certain embodiments, (b) may include taking a photograph or video of the electrochromic windows. The method may further include processing the photograph or video using a program including image processing software to determine the commissioning states of the electrochromic windows. In some embodiments, the method may further include manually overriding a commissioning state determination made by the program to correct the commissioning state of an electrochromic window whose commissioning state was incorrectly determined by the program. The program may be configured to match a set of electrochromic windows in a first photograph with the same set of electrochromic windows in a second photograph, the first and second photographs being taken at different times.

In various embodiments, determining the association between the window controllers and their associated windows may include determining which window controller is connected with which electrochromic window. In certain implementations, the network of electrochromic windows may include two or more groups of electrochromic windows. In some such embodiments, the method may be performed simultaneously on each group of windows. In these or other embodiments, the method may further include collecting current and/or voltage data corresponding to the current and/or voltage experienced by the electrochromic windows during an optical transition, and comparing the collected current and/or voltage data to expected current and/or voltage data to thereby confirm the associations determined in (d) between the window controllers and their associated electrochromic windows.

In a further aspect of the disclosed embodiments, a method of determining associations between window controllers and associated electrochromic windows installed in a network is provided, each electrochromic window including a light, the method including: (a) providing instructions to each window controller to simultaneously display a light pattern on the light of the window controller's associated electrochromic window(s), where the light patterns are unique for each of the window controllers; (b) recording the light patterns displayed on the lights of the electrochromic windows; and (c) determining the association between the window controllers and their associated electrochromic windows by comparing the instructions provided in (a) with the light patterns observed in (b).

In some implementations, the lights may include light emitting diodes (LEDs). In these or other embodiments, (b) may include taking a video of the electrochromic windows. In some such embodiments, the method may further include processing the video using a program including image processing software to determine the light pattern displayed by the lights of the electrochromic windows. In various embodiments, determining the association between the window controllers and their associated windows may include determining which window controller is connected with which electrochromic window. In these or other implementations, the network of electrochromic windows may include two or more groups of electrochromic windows. In various cases, the method may be performed simultaneously on each group of windows.

These and other features and advantages will be described in further detail below, with reference to the associated drawings.

BRIEF DESCRIPTION OF THE DRAWINGS

The following detailed description can be more fully understood when considered in conjunction with the drawings in which:

FIGS. 2E and 2G depict example graphical user interfaces that may be used for commissioning electrochromic windows using the method of FIG. 2A.

FIG. 3B depicts a set of electrochromic windows during three different tint steps as described in relation to FIG. 3A.

FIGS. 3C-3E depict a set of electrochromic windows and relevant information about such windows during a method in which the association between window controllers and their associated electrochromic windows is determined.

DETAILED DESCRIPTION

Electrochromic windows may be used in a variety of settings, for example in office buildings and residential buildings. Often, such windows may be provided in a network having multiple electrochromic windows installed therein. Various difficulties can arise when installing and commissioning such networks. For example, it can be difficult to track which electrochromic window is to be installed at each location. Similarly, it can be difficult to track which controller (e.g., window controller or other controller) is to be associated with each electrochromic window. For these reasons, electrochromic windows and their associated window controllers are often mis-paired and/or installed at an incorrect location. Further, even in cases where there is some flexibility regarding where each electrochromic window and its associated window controller are installed, it can be difficult to determine which electrochromic window is actually installed at a particular location, and which window controller is actually associated with each electrochromic window after installation. Various methods described herein may be used to facilitate commissioning networks of electrochromic windows.

Example Controller Network Architecture

Figure 1:
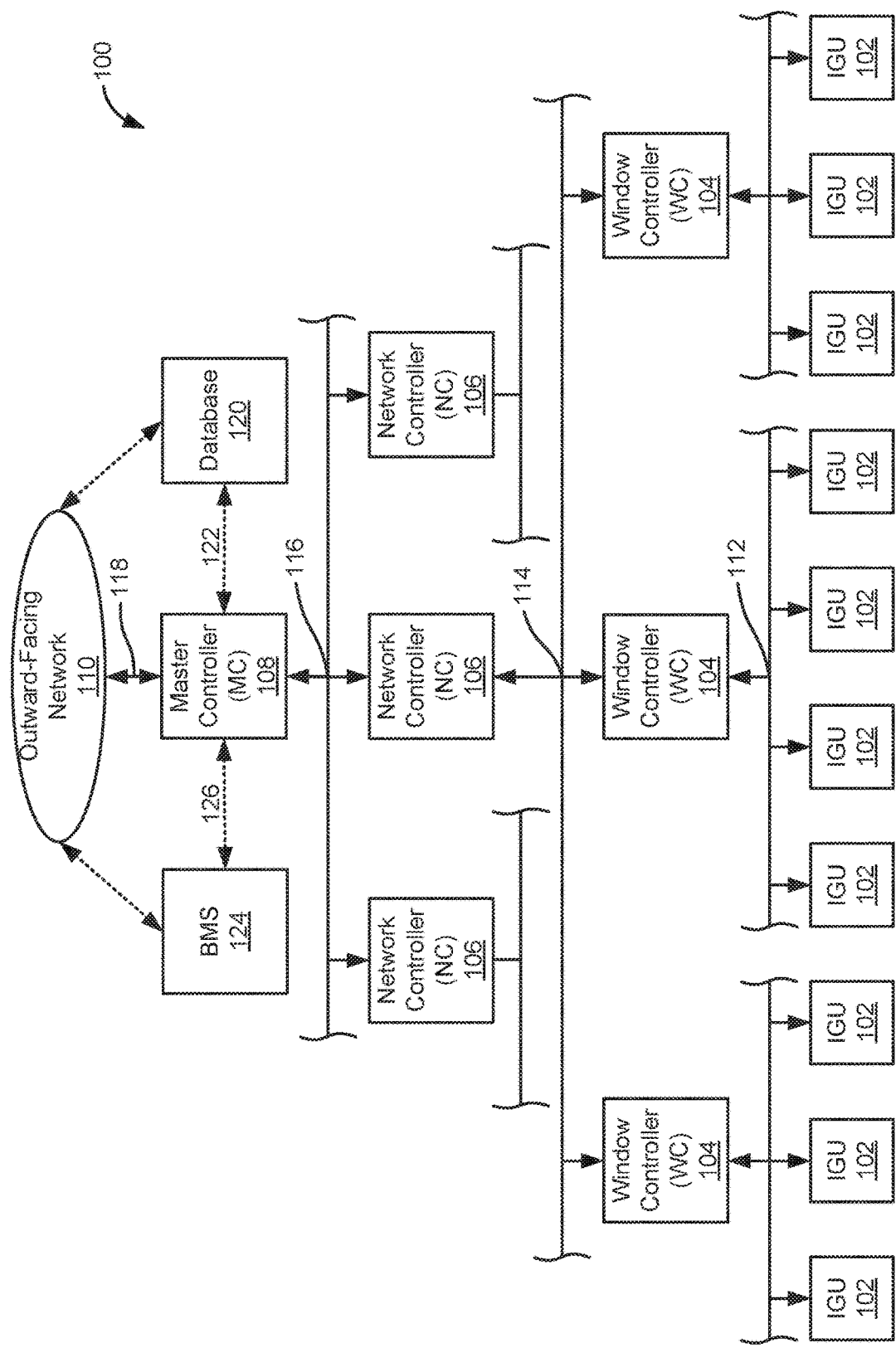
FIG. 1 depicts a distributed network of EC window controllers with end or leaf controllers and a distributed network with EC windows having onboard controllers.

In many instances, optically-switchable windows can form or occupy substantial portions of a building envelope. For example, the optically-switchable windows can form substantial portions of the walls, facades and even roofs of a corporate office building, other commercial building or a residential building. In various implementations, a distributed network of controllers can be used to control the optically-switchable windows. FIG. 1 shows a block diagram of an example network system, 100, operable to control a plurality of IOUs 102 in accordance with some implementations. One primary function of the network system 100 is controlling the optical states of the ECDs for other optically-switchable devices) within the IGUs 102. In some implementations, one or more of the windows 102 can be multi-zoned windows, for example, where each window includes two or more independently controllable ECDs or zones. In various implementations, the network system 100 is operable to control the electrical characteristics of the power signals provided to the IGUs 102. For example, the network system 100 can generate and communicate tinting instructions (also referred to herein as "tint commands") to control voltages applied to the ECDs within the IGUs 102.

In some implementations, another function of the network system 100 is to acquire status information from the IGUs 102 (hereinafter "information" is used interchangeably with "data"). For example, the status information for a given IGU can include an identification of, or information about, a current tint state of the ECD(s) within the IGU. The network system 100 also can be operable to acquire data from various sensors, such as temperature sensors, photosensors (also metered to herein as light sensors), humidity sensors, air flow sensors, or occupancy sensors, whether integrated on or within the IGUs 102 or located at various other positions in, on or around the building.

The network system 100 can include any suitable number of distributed controllers having various capabilities or functions. In some implementations, the functions and arrangements of the various controllers are defined hierarchically. For example, the network system 100 includes a plurality of distributed window controllers (WCs) 104, a plurality of network controllers (NCs) 106, and a master controller (MC) 108. In some implementations, the MC 108 can communicate with and control tens or hundreds of NCs 106. In various implementations, the MC 108 issues high level instructions to the NCs 106 over one or more wired or wireless links 116 (hereinafter collectively referred to as "link 116"). The instructions can include, for example, tint commands for causing transitions in the optical states of the IGUs 102 controlled by the respective NCs 106. Each NC 106 can, in turn, communicate with and control a number of WCs 104 over one or more wired or wireless links 114 (hereinafter collectively referred to as "link 114"). For example, each NC 106 can control tens or hundreds of the WCs 104. Each WC 104 can, in turn, communicate with, drive or otherwise control one or more respective IGUs 102 over one or more wired or wireless links 112 (hereinafter collectively referred to as "link 112").

The MC 108 can issue communications including tint commands, status request commands, data (for example, sensor data) request commands or other instructions. In some implementations, the MC 108 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 108 determines to cause a tint state change in a set of one or more IGUs 102, the MC 108 generates or selects a tint value corresponding to the desired tint state. In some implementations, the set of IGUs 102 is associated with a first protocol identifier (ID) (for example, a BACnet ID). The MC 108 then generates and transmits a communication—referred to herein as a "primary tint command"—including the tint value and the first protocol ID over the link 116 via a first communication protocol (for example, a BACnet compatible protocol). In some implementations, the MC 108 addresses the primary tint command to the particular NC 106 that controls the particular one or more WCs 104 that, in turn, control the set of IGUs 102 to be transitioned.

The NC 106 receives the primary tint command including the tint value and the first protocol ID and maps the first protocol ID to one or more second protocol IDs. In some implementations, each of the second protocol IDs identifies a corresponding one of the WCs 104. The NC 106 subsequently transmits a secondary tint command including the tint value to each of the identified WCs 104 over the link 114 via a second communication protocol. In some implementations, each of the WCs 104 that receives the secondary tint command then selects a voltage or current profile from an internal memory based on the tint value to drive its respectively connected IGUs 102 to a tint state consistent with the tint value. Each of the WCs 104 then generates and provides voltage or current signals over the link 112 to its respectively connected IGUs 102 to apply the voltage or current profile.

In some implementations, the various IGUs 102 can be advantageously grouped into zones of EC windows, each of which zones includes a subset of the NCs 106. In some implementations, each zone of IGUs 102 is controlled by one or more respective NCs 106 and one or more respective WCs 104 controlled by these NCs 106. In some more specific implementations, each zone can be controlled by a single NC 106 and two or more WCs 104 controlled by the single NC 106. Said another way, a zone can represent a logical grouping of the IGUs 102. For example, each zone may correspond to a set of IGUs 102 in a specific location or area of the building that are driven together based on their location. As a more specific example, consider a building having four faces or sides: a North face, a South face, an East Face and a West Face. Consider also that the building has ten floors. In such a didactic example, each zone can correspond to the set of electrochromic windows 100 on a particular floor and on a particular one of the four faces. Additionally or alternatively, each zone may correspond to a set of IGUs 102 that share one or more physical characteristics (for example, device parameters such as size or age). In some other implementations, a zone of IGUs 102 can be grouped based on one or more non-physical characteristics such as, for example, a security designation or a business hierarchy (for example, IGUs 102 bounding managers' offices can be grouped in one or more zones while IGUs 102 bounding non-managers' offices can be grouped in one or more different zones).

In some such implementations, each NC 106 can address all of the IGUs 102 in each of one or more respective zones. For example, the MC 108 can issue a primary tint command to the NC 106 that controls a target zone. The primary tint command can include an abstract identification of the target zone (hereinafter also referred to as a "zone ID"). In some such implementations, the zone ID can be a first protocol ID such as that just described in the example above. In such cases, the NC 106 receives the primary tint command including the tint value and the zone ID and maps the zone ID to the second protocol IDs associated with the WCs 104 within the zone. In some other implementations, the zone ID can be a higher level abstraction than the first protocol IDs. In such cases, the NC 106 can first map the zone ID to one or more first protocol IDs, and subsequently map the first protocol IDs to the second protocol IDs.

User or Third Party Interaction with Network

In some implementations, the MC 108 is coupled to one or more outward-facing networks, 110, (hereinafter collectively referred to as "the outward-facing network 110") via one or more wired or wireless links 118 (hereinafter "link 118"). In some such implementations, the MC 108 can communicate acquired status information or sensor data to remote computers, mobile devices, servers, databases in or accessible by the outward-facing network 110. In some implementations, various applications, including third party applications or cloud-based applications, executing within such remote devices can access data from or provide data to the MC 108. In some implementations, authorized users or applications can communicate requests to modify the tint states of various IGUs 102 to the MC 108 via the network 110. In some implementations, the MC 108 can first determine whether to grant the request (for example, based on power considerations or based on whether the user has the appropriate authorization) prior to issuing a tint command. The MC 108 can then calculate, determine, select or otherwise generate a tint value and transmit the tint value in a primary tint command to cause the tint state transitions in the associated IGUs 102.

For example, a user can submit such a request from a computing device, such as a desktop computer, laptop computer, tablet computer or mobile device (for example, a smartphone). In some such implementations, the user's computing device can execute a client-side application that is capable of communicating with the MC 108, and in some instances, with a master controller application executing within the MC 108. In some other implementations, the client-side application can communicate with a separate application, in the same or a different physical device or system as the MC 108, which then communicates with the master controller application to effect the desired tint state modifications. In some implementations, the master controller application or other separate application can be used to authenticate the user to authorize requests submitted by the user. Ire some implementations, the user can select the IGUs 102 to be tinted, and inform the MC 108 of the selections, by entering a room number via the client-side application.

Additionally, or alternatively, in some implementations, a user's mobile device or other computing device can communicate wirelessly with various WCs 104, For example, a client-side application executing within a user's mobile device can transmit wireless communications including tint state control signals to a WC 104 to control the tint states of the respective IGUs 102 connected to the WC 104. For example, the user can use the client-side application to maintain or modify the tint states of the 102 adjoining a room occupied by the user (or to be occupied by the user or others at a future time). Such wireless communications can be generated, formatted or transmitted using various wireless network topologies and protocols.

In some such implementations, the control signals sent to the respective WC 104 from the user's mobile device (or other computing device) can override a tint value previously received by the WC 104 from the respective NC 106. In other words, the WC 104 can provide the applied voltages to the IGUs 102 based on the control signals from the user's computing device rather than based on the tint value. For example, a control algorithm or rule set stored in and executed by the WC 104 can dictate that one or more control signals from an authorized user's computing device take precedence over a tint value received from the NC 106. In some other instances, such as in high demand cases, control signals such as a tint value from the NC 106 may take precedence over any control signals received by the WC 104 from a user's computing device. In some other instances, a control algorithm or rule set may dictate that tint overrides from only certain users or groups or classes of users may take precedence based on permissions granted to such users, as well as in some instances, other factors including time of day or the location of the IGUs 102.

In some implementations, based on the receipt of a control signal from an authorized user's computing device, the MC 108 can use information about a combination of known parameters to calculate, determine, select or otherwise generate a tint value that provides lighting conditions desirable for a typical user, while in some instances also using power efficiently. In some other implementations, the MC 108 can determine the tint based on preset preferences defined by or for the particular user that requested the tint state change via the computing device. For example, the user may be required to enter a password or otherwise login or obtain authorization to request a tint state change. In such instances, the MC 108 can determine the identity of the user based on a password, a security token or based on an identifier of the particular mobile device or other computing device. After determining the user's identity, the MC 108 can then retrieve preset preferences for the user, and use the preset preferences alone or in combination with other parameters (such as power considerations or information from various sensors) to generate and transmit a tint value for use in tinting the respective IGUs 102.

Integration with Other Systems or Services

In some implementations, the network system 100 also can be designed to function in conjunction with modern heating, ventilation, and air conditioning (HVAC) systems, interior lighting systems, security systems or power systems as an integrated and efficient energy control system for an entire building or a campus of buildings. Some implementations of the network system 100 are suited for integration with a building management system (BMS), 124. A BMS is broadly a computer-based control system that can be installed in a building to monitor and control the building's mechanical and electrical equipment such as HVAC systems (including furnaces or other heaters, air conditioners, blowers and vents), lighting systems, power systems, elevators, fire systems, and security systems. The BMS can include hardware and associated firmware and software for maintaining conditions in the building according to preferences set by the occupants or by a building manager or other administrator. The software can be based on, for example, internee protocols or open standards. A BMS can typically be used in large buildings where it functions to control the environment within the building. For example, the BMS can control lighting, temperature, carbon dioxide levels, and humidity within the building. To control the building environment, the BMS can turn on and off various mechanical and electrical devices according to rules or in response to conditions. Such rules and conditions can be selected or specified by a building manager or administrator, for example. One function of a BMS can be to maintain a comfortable environment for the occupants of a building while minimizing heating and cooling energy losses and costs. In some implementations, the BMS can be configured not only to monitor and control, but also to optimize the synergy between various systems, for example, to conserve energy and lower building operation costs.

Additionally or alternatively, some implementations of the network system 100 are suited for integration with a smart thermostat service, alert service (for example, fire detection), security service or other appliance automation service. On example of a home automation service is NEST®, made by Nest Labs of Palo Alto, Calif., (NEST® is a registered trademark of Google, Inc. of Mountain View, Calif.). As used herein, references to a EMS can in some implementations also encompass, or be replaced with, such other automation services.

In some implementations, the MC 108 and a separate automation service, such as a BMS 124, can communicate via an application programming interface (API). For example, the API can execute in conjunction with a master controller application (or platform) within the MC 108, or in conjunction with a building management application (or platform) within the BMS 124. The MC 108 and the EMS 124 can communicate over one or more wired links 126 or via the outward-facing network 110. In some instances, the EMS 124 can communicate instructions for controlling the IGUs 102 to the MC 108, which then generates and transmits primary tint commands to the appropriate NCs 106. In some implementations, the NCs 106 or the WCs 104 also can communicate directly with the EMS 124 (whether through a wired/hardware link or wirelessly through a wireless data link). In some implementations, the EMS 124 also can receive data, such as sensor data, status data and associated timestamp data, collected by one or more of the MC 108, the NCs 105 and the WCs 104. For example, the MC 108 can publish such data over the network 110. In some other implementations in which such data is stored in a database 120, the EMS 124 can have access to some or all of the data stored in the database 120.

In some implementations, the MC 108 is coupled to an external database (or "data store" or "data warehouse") 120. In some implementations, the database 120 can be a local database coupled with the MC 108 via a wired hardware link 122. In some other implementations, the database 120 can be a remote database or a cloud-based database accessible by the MC 108 via an internal private network or over the outward-facing network 110. In some implementations, other computing devices, systems or servers also can have access to read the data stored in the database 120, for example, over the outward-facing network 110. Additionally, in some implementations, one or more control applications or third party applications also can have access to read the data stored in the database via the outward-facing network 110.

Networks of electrochromic windows, as well as the various controllers that may be used to control the network, are further described in PCT Patent Application No. PCT/US16/58872, filed Oct. 26, 2016, and titled "CONTROLLERS FOR OPTICALLY-SWITCHABLE DEVICES," which is herein incorporated by reference in its entirety.

Configuring/Commissioning Networks of Electrochromic Windows

After a network of electrochromic windows is physically installed, the network may need to be configured such that it is known which window is installed in which location, and paired with which window controller. For example, in some installations, there may be thousands of windows and window controllers. During installation, an installer typically doesn't keep track of which window or windows are paired with a particular window controller. Once sealed in the wall or framing, there is no easy way to determine this pairing. Although in some cases each window controller may be assigned to a particular window, which may be assigned to a particular location in the building, during installation it is common for a window controller and/or window to be installed in an incorrect location. For instance, a window controller may be paired with the wrong window, or the window may be installed in the wrong location. These mis-pairings can be difficult to address. Various methods described herein overcome these mis-pairing issues. Additionally, the physical window installation and the wiring installation in the building are typically done by different teams at different times during the construction process. As such, if the windows and controllers are not pre-assigned to one another, but rather are mated during commissioning, it simplifies the installation and commissioning process.

Further, the commissioning methods described herein may be used to simultaneously identify many electrochromic windows. In a number of cases, all of the windows on a network can be simultaneously identified. This improvement significantly speeds up the commissioning process.

In various embodiments, an auto-configuration protocol may be used to automatically configure the windows/controllers without any manual intervention, and without the need for any software configuration programs or jumpers. Auto-configuring devices are also sometimes referred to as "plug-and-play" devices. These devices merely need to be powered up and they automatically configure themselves. Configurations may be stored in NVRAM, loaded by a host processor, or negotiated at the time of system initialization, for instance. Examples of auto-configuration protocols include, but are not limited to, Dynamic Host Configuration Protocol (DHCP), Internet Protocol version 6 (IPv6) stateless auto-configuration, Ad Hoc Configuration Protocol (AHCP), Proactive Autoconfiguration, Dynamic WMN Configuration Protocol (DWCP), etc.

The configuration process (automated or not, in a mesh network, linear bus network, or other network) for a particular IGU may involve reading and transmitting an ID for the IGU and/or its associated window controller. Further information related to commissioning/configuring a network of electrochromic windows is presented in U.S. patent application Ser. No. 14/391,122, filed Oct. 7, 2014, and titled "APPLICATIONS FOR CONTROLLING OPTICALLY SWITCHABLE DEVICES," and in U.S. patent application Ser. No. 14/951,410, filed Nov. 24, 2015, and titled "SELF-CONTAINED EC IGU," which are each herein incorporated by reference in their entireties.

In some cases, some type of feedback (e.g., from a manual input such as a button/switch/etc., or from an indicator or sensor such as a light sensor, motion sensor, occupancy sensor, temperature/heat sensor, etc.) may be used to identify particular IGUs. This information may be shared over the network, for example to a network controller and/or to other window controllers. This identification process may be one step in generating a map or other directory of all the electrochromic windows on the network. In various embodiments, the IGU identification/configuration process may involve individually triggering each IGU controller to cause the IGU's associated controller to send a signal to the network. The signal may include the IGU's identification number and/or the identification number of the controller associated with the IGU.

In one example where the window controller is provided in multiple parts including a dock that may be integral with an IGU and a carrier that fits into the dock, an installer(s) will install IGUs in their physical location in a building. The IGUs will have the dock, but not the controller. The dock may have a chip or memory component which contains the physical characteristics/parameters of the IGU. Then, a carrier (controller) is attached into/onto each dock. Once the carrier is mated with the dock, the controller can read the chip or memory component associated with the IGU, when triggered.

The triggering may occur through a variety of mechanisms. In one example, the IGUs include a light sensor that can be triggered via a laser pointer or other shining light. An installer can shine the laser pointer on the sensor of the IGU to cause the IGU to send a signal to the system with the IGU's/controller's identification. Because the installer knows where the laser pointer is being pointed, this allows for a relatively easy way to associate each IGU with its physical location. This laser pointer method is highly reliable, and can be used to identify large numbers of windows, even when provided in a curtain wall with many adjacent IGUs. In another example, the IGUs include a light sensor, motion sensor, occupancy sensor, etc. that can be triggered by blocking or disrupting the sensor (e.g., waving at the sensor, covering the sensor, etc.). In another example, the IGUs include a sensor that can be triggered by placing a magnet near the sensor. In yet another example, the IGUs include a button or switch that can be manually activated to cause the IGU to send a signal to the network. In another example, the IGUs include a temperature and/or heat sensor that can be triggered by aiming a focused heat source (e.g., heat gun) at the sensor. The temperature/heat sensor can, for example, be located within or on the IGU, e.g., as part of an onboard controller. Regardless of the type of trigger used, this feature may enable an easy configuration process for commissioning several electrochromic windows on a network.

The sensor(s) used for triggering the IGUs may be positioned anywhere on the IGUs, e.g., on a pane (e.g., on S1, S2, S3, S4, S5, S6, etc., where the surfaces are counted from the outermost surface (S1) to the innermost surface), on a frame or other component in which the IGU is installed, proximate the IGU on a wall, etc. In various cases, the sensor(s) used for triggering the IGUs may be positioned on the inbound surface of the most inbound pane (e.g., S4 on a two pane IGU, or S6 on a three pane IGU, or S2 of an electrochromic window having only a single pane). In cases where the sensor is a temperature sensor, the sensor may be unidirectional (sensing heat from one direction) and, e.g., only sensing a temperature/heat signal from within the building. In other cases the sensor may be omnidirectional (or may have both unidirectional and omnidirectional modes). The temperature sensor may be an infrared sensor, as used in a remote control device, such as a TV remote. The positioning of the temperature sensor (or other sensor) can be within or on an onboard controller, or not. An onboard or "in situ" controller is a localized controller that is part of a window assembly. An onboard controller is distinguished from controllers that are positioned elsewhere (in many cases in a control closet, connected to the electrochromic device via long wires). While various methods described herein (e.g., commissioning methods, etc.) are described in the context of an IGU, it is understood that other types of windows can utilize these same methods. For example, a temperature sensor (or any other sensor that may be triggered) may be located on an electrochromic window having a laminate structure, the sensor optionally being part of a controller, e.g., an on-glass controller, or not.

In one example, a network of electrochromic windows includes 10 windows, with two windows provided in each of five rooms. After the IGUs are physically installed, a user/installer may commission the windows to identify each IGU and associate it with its physical location in the network. The installer may use an electronic device such as a phone, tablet, computer, etc. to help commission the windows. A program on the electronic device may include a list, directory, and/or map of all the electrochromic windows on the network. When the installer enters the first room, she can trigger the first electrochromic window, thereby causing the controller to send a signal over the network with the window's (and/or controller's) identification. As a result of this signal, the identification for the triggered window may pop up on the electronic device. The user can then associate the identification with the physical location of the window they triggered. In one example where the program on the electronic device generates (or otherwise utilizes) a map of the windows, this association may be made in a graphical user interface (GUI), e.g., by dragging the triggered identification number onto the map at the appropriate location, or by clicking the map at the appropriate location in response to the triggered identification appearing. The map may be generated through the mesh network techniques described in U.S. patent application Ser. No. 14/951,410 (incorporated by reference above), or the map may be preloaded into the commissioning person's computing device using schematics of the installation that are drawn up as part of the building plans, for example. After the first window is associated with its physical location, the installer can trigger the second window in the first room and thereby associate the identification of the second IGU/controller with its physical location. This process can then be repeated for each of the other rooms in which electrochromic windows are installed.

In another example, each electrochromic IGU may include a beacon that transmits information related to the IGU, for example the identification of the IGU and/or the associated controller. Bluetooth Low Energy (BLE) beacons may be used in some cases. An installer may have a receiver to allow them to read the beacon. Phones and other electronic devices commonly have Bluetooth receivers that could be used for this purpose. Any appropriate receiver may be used. An installer may read the information on the beacons during commissioning to associate the identification for each IGU/controller with the physical location of the IGU. A map or directory may be used to accomplish this association.

In a similar embodiment, each IGU may be triggered over the network, which may cause a component on the IGU to notify an installer/user that it has been triggered. In one example, each IGU may include a light (e.g., an LED or other light) that can be activated. A signal can be sent over the network to trigger a relevant IGU or window controller, which then causes the light on the relevant IGU to be turned on (or off, or blink, or blink in a certain pattern, etc.). An installer/user can then identify the relevant IGU by seeing which IGU has the triggered light or light pattern. Based on this process and information, the installer/user can associate each IGU/controller with its physical location and identification.

In one example, each controller is instructed to display a unique light pattern such that all of the windows on the network (or in some cases, a subset thereof) can be simultaneously triggered and observed. The light patterns can be distinguished from one another based on the frequency of light pulses, the duration of light pulses, the time between light pulses, the brightness of light pulses, etc. The light patterns may have certain characteristics that make them easier to detect. For instance, each "on" and/or "off" of the pattern may be a minimum duration that allows for the "on" or "off" to be detected by a camera. In some cases this minimum duration may be about 50 ms, which may be sufficient for a 60 Hz camera to pick up 3 frames.

In one example, the light patterns are configured to display information in binary (e.g., light off=0, light on=1). This technique may be used to encode any information about the window/window controller, including the relevant IDs for these components.

In some cases, the light patterns may repeat until instructed to stop, allowing sufficient time for an installer to observe and record the light patterns. Such recordation may occur manually, though in various cases it may be done using an electronic application that may be configured to detect and record the light patterns. The light patterns may each begin with a uniform "starting sequence" and/or end with a uniform "ending sequence" that may be used to determine the starting and/or ending points of a light pattern. The light patterns may have the same duration between different windows, such that all the light patterns repeat at the same frequency. In other cases, the light patterns may have different durations, and may repeat at the same or different frequencies.

The light may be provided anywhere on the window, so long as it is detectable in some fashion and is capable of receiving power. In one example, an LED is provided between the panes of an IGU, and may be flush with a spacer. The light may also be provided on one of the panes, outside of the interior region of the IGU. The light may be provided within the viewable area of the IGU. In various cases, the light may be flush with the spacer, as mentioned, to minimize the visual distraction associated with the light. The light may emit visible light or non-visible (e.g., IR-wavelength) light. In cases where the light is non-visible to human eyes, a detector may be used to observe and record the light patterns.

The LED may be electrically connected with a window controller using any available electrical connection. The LED may also be self-powered, for example with a battery, supercapacitor, photovoltaic device, etc. In some cases, the LED may be electrically connected to or with a pigtail that is attached to the IGU, where the pigtail is used to provide power to the IGU.

Once the light patterns are recorded, it can be determined which window controller is connected to which window, and where each window is located. This determination may be made by comparing the instructions sent by each window controller to the observed light patterns on the various windows. In various cases, the comparison/association is performed by a program/application (which may be operated by an installer), as described further below. Moreover, if any of the LEDs fail to display a light pattern, the associated windows can be flagged as potentially being mis-wired or otherwise faulty. One advantage of the LED commissioning method is that LEDs are relatively inexpensive. Another advantage is that the identifications can be made very quickly, as there is no need to wait for the windows to perform any optical transitions.

Figure 2A:
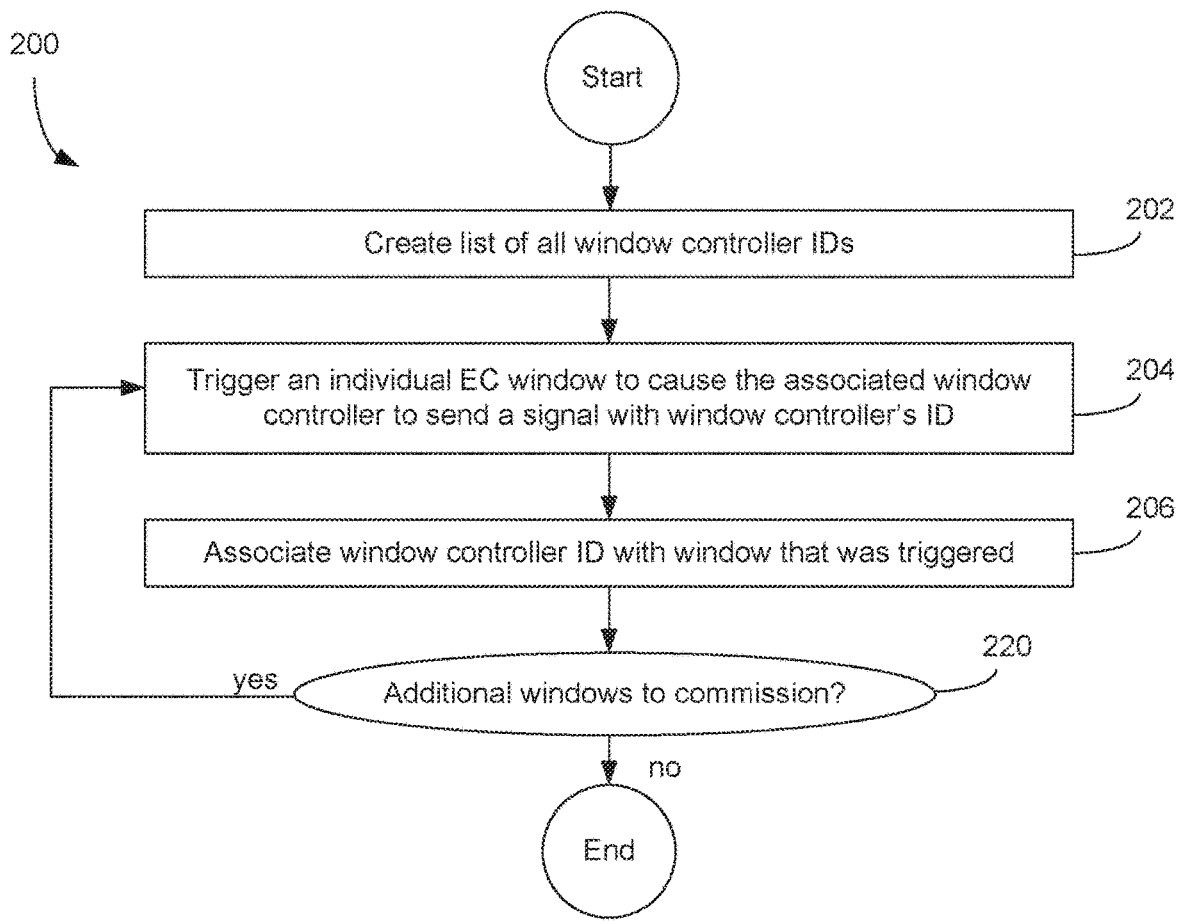
FIG. 2A is a flowchart describing a method of commissioning electrochromic windows.

FIG. 2A is a flowchart depicting a method 200 of commissioning a network of electrochromic windows according to certain embodiments. For example, after all the IGUs have an associated controller, at operation 202, a list of all the window controller IDs is created. This step is explained further below with reference to FIGS. 2C-2E. The window controller IDs may include a number of individual identifying factors about each window. This information is stored, e.g., in a chip in each window assembly, e.g., in a dock (or wiring harness). In one example, the window ID includes a CAN ID and a LITE ID. The CAN ID may relate to a unique address of the window/window controller on the CAN bus system, while the LITE ID may relate to a unique serial number of the electrochromic IGU and/or its associated window controller. The LITE ID (or other ID used) may also include information about the window such as its size, properties of the electrochromic device, parameters to be used when transitioning the electrochromic device, etc. After the list of window controllers is generated, an individual window controller is triggered in operation 204. The triggering may occur through any of the methods described herein. This trigger causes the relevant window controller to send a signal with the window controller's ID. In response, a user can associate the triggered window controller's ID with the window's physical location in operation 206. Operations 204 and 206 are further explained in the context of FIGS. 2F and 2G. At operation 220, it is determined whether there are additional windows to commission. If there are additional windows to commission, the method repeats from operation 204. The method is complete when all of the windows are commissioned.

Figure 2B:
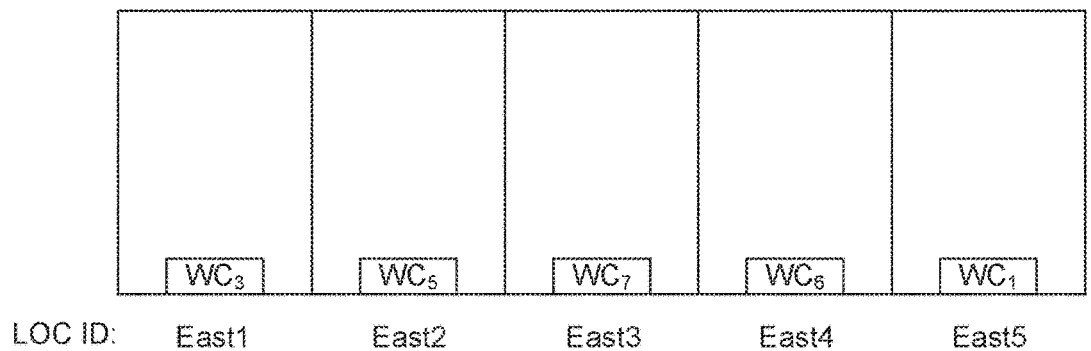
FIG. 2B is a representation of the physical location of a plurality of electrochromic windows that is commissioned in the context of FIGS. 2A-2G.

FIG. 2B presents a representation of the physical location of five electrochromic windows installed on an East wall of a building. The "LOC ID" refers to the location of the relevant window, in this case labeled, arbitrarily, East1-East5. Additional electrochromic windows may be provided elsewhere in the building. The method of FIG. 2A, for example as explained in relation to FIGS. 2C-2G, may be performed on the set of windows shown in FIG. 2B.

Figure 2C:
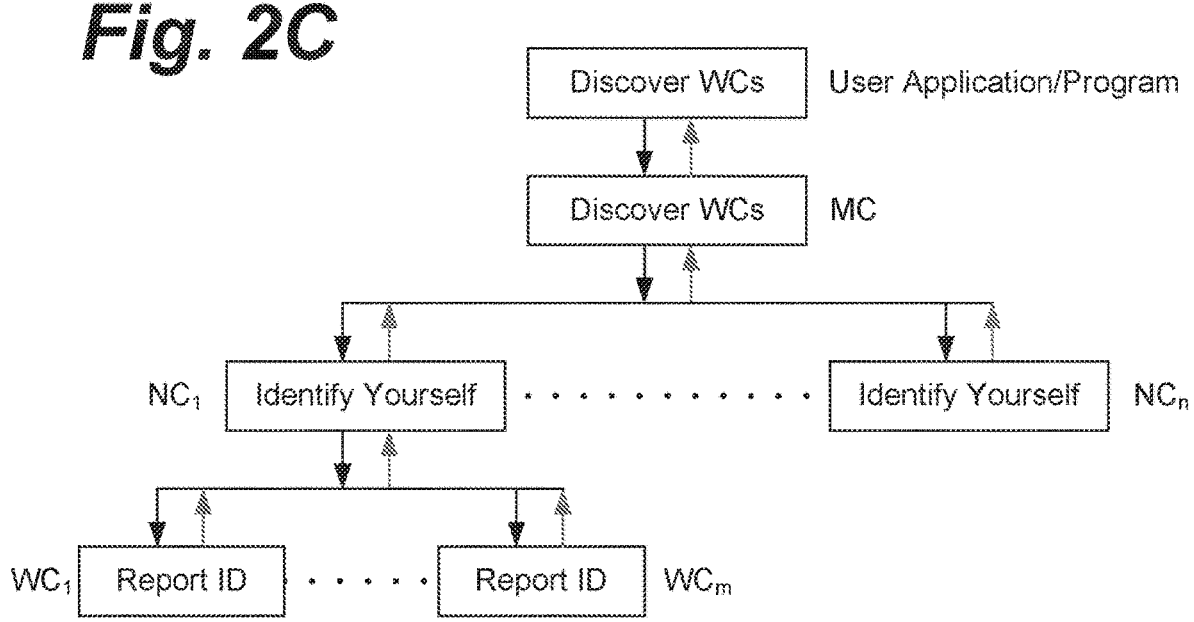
FIG. 2C illustrates in closer detail certain steps that may be taken during the method of FIG. 2A.
Figure 2D:
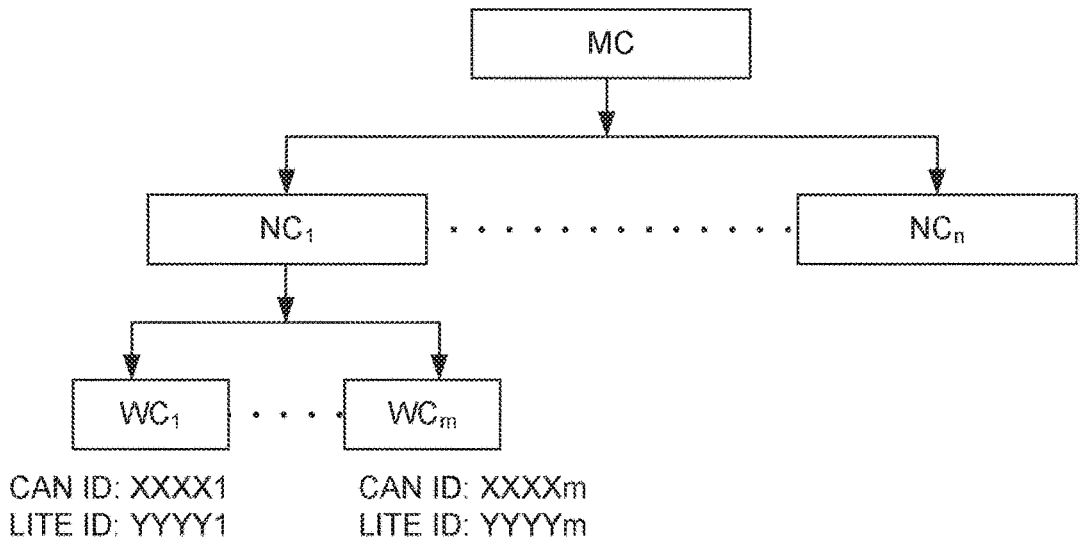
FIG. 2D is a representation of a network of electrochromic windows that may be used in the context of FIGS. 2A-2G.

FIG. 2C illustrates steps that may be taken during operation 204 of FIG. 2A. In this example, the network of electrochromic windows includes a master controller (MC), two or more network controllers ($NC_1$-$NC_n$), and several window controllers ($WC_1$-$WC_m$). For the sake of clarity, only information relevant to window controllers that operate under the first network controller ($NC_1$) are shown. The dotted lines indicate that many other network controllers and window controllers may be present. First, a user may initiate a command, via a user application/program/etc., to cause the window controllers to be discovered. The user application/program forwards this command to the master controller. The master controller directs the network controllers to discover the window controllers, and the network controllers direct the window controllers to identify themselves. In response, the window controllers report their IDs to the network controllers, which then report the window controller IDs to the master controller, which reports the window controller IDs to the user application/program. The master controller and/or the user application/program may aggregate this information to create the list of all window controllers. This list may include information detailing which window controllers are controlled by each network controller. The list may also be provided as a chart that shows the configuration of all the relevant controllers on the network, as shown in FIG. 2D. The network representation shown in FIG. 2D may appear on the graphical user interface in some cases.

FIG. 2E depicts an example of user interface features that may be presented to a user after operation 204 is complete and the list of window controller IDs is created. On the upper portion of FIG. 2E, a map of the relevant windows is shown. This map may be created by any means available, and in some cases may be specifically programmed for each installation. After operation 204, it is still not known where each window is positioned. Thus, the map does not yet show the CAN ID or LITE ID for any of the windows, but rather has empty fields that will be populated with this information during the commissioning process. On the bottom portion of FIG. 2E, a list of the window controller IDs is provided. After operation 204, all of the window IDs (the CAN IDs and LITE IDs) are generally known, but they have not yet been associated with their physical positions (the LOC IDs). For this reason, the bottom portion of FIG. 2E shows the CAN IDs and LITE IDs as populated, while the LOC IDs are still blank. A similar list may be provided for each of the different network controllers.

Figure 2F:
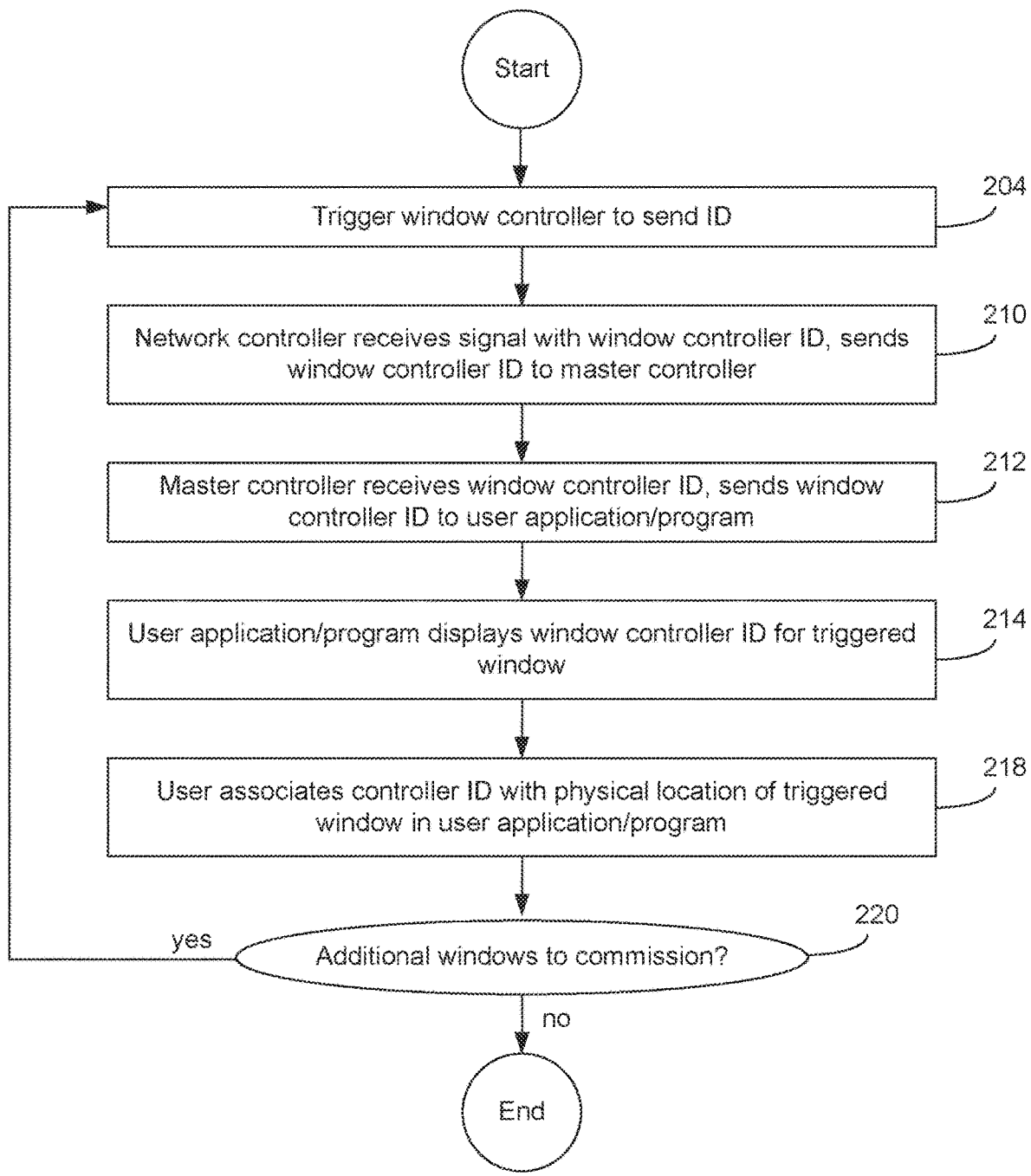
FIG. 2F is a flowchart further explaining certain steps that may occur in the method of FIG. 2A.

FIG. 2F is a flowchart that presents a method for performing operations 204 and 206 from FIG. 2A in more detail, according to one embodiment. In FIG. 2F, the method begins at operation 204, where a user triggers a window controller, thereby causing it to send the window controller ID to its associated network controller. The network controller receives the signal with the window controller ID, and sends the window controller ID to the master controller at operation 210. Next, at operation 212, the master controller receives the signal with the window controller ID, and sends the window controller ID to a user application/program/etc. At operation 214, the user application/program displays the window controller ID for the triggered window. Next, at operation 218, the user may associate the window ID of the triggered window with the physical location of the window that was triggered. In one example, the user drags the window ID displayed in operation 214 onto the physical location of the triggered window as represented on the map of windows. With reference to FIG. 2E, for instance, a particular window ID (e.g., CAN ID and LITE ID) may become bold or otherwise noticeable in the user application/program in response to the window controller being triggered. The user can see the bolded window ID, then drag it onto the map at an appropriate location. Conversely, the user may drag the relevant window from the map onto the triggered window ID. Similarly, a user may click on the triggered window ID and click on the relevant window from the map to associate the two. Various methods may be used.

FIG. 2G depicts an example graphical user interface similar to the one shown in FIG. 2E, after the window positioned at East5 has been identified and associated with its relevant window ID/location. As shown in FIG. 2B, the window at East5 has $WC_1$ installed thereon. Therefore, the CAN ID for $WC_1$ (XXXX1) and the LITE ID for $WC_1$ (YYYY1) are displayed below the window at the East5 location. Similarly, as shown in the bottom portion of FIG. 2G, the list of window controller IDs now includes a LOC ID for $WC_1$. The triggering and location/ID association steps can be repeated until all of the windows are identified and associated with their positions within the building. The fact that $WC_1$ was triggered first was chosen merely for the sake of clarity in the figures. The window controllers can be triggered in any order.

Returning to FIG. 2F, at operation 220 it is determined whether there are any additional windows to commission. If not, the method is complete. If there are additional windows to commission, the method repeats on a different window starting at operation 204.

Figure 3A:
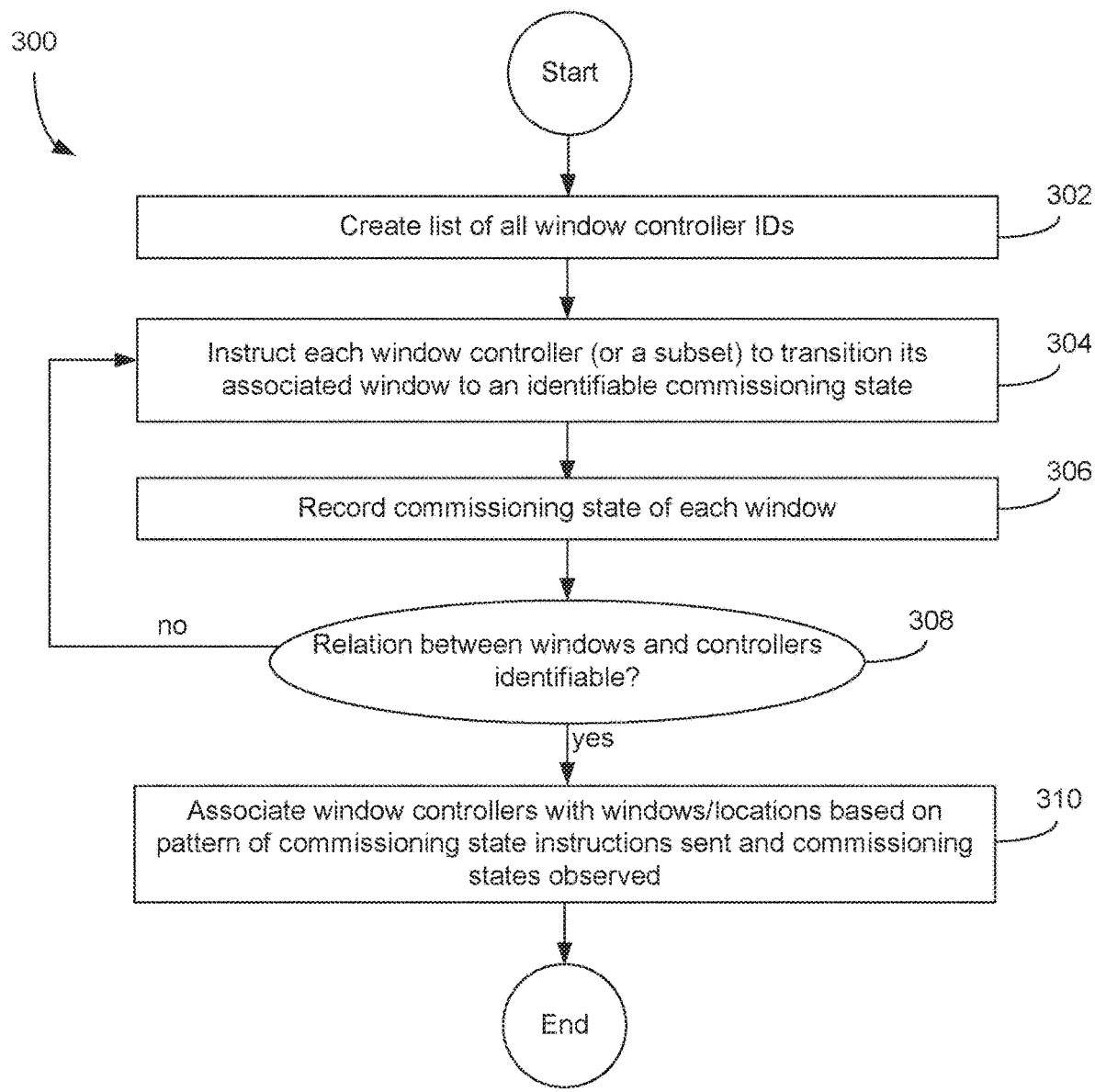
FIG. 3A is a flowchart illustrating a method of determining the association between window controllers and their associated electrochromic windows.

FIG. 3A presents a flowchart for a method 300 for commissioning electrochromic windows. This example assumes that each window controller controls a single associated electrochromic window (though in some cases a single window controller may control multiple electrochromic windows). At operation 302, a list of all the window controller IDs is created. This may be done automatically or manually. In some cases, the installed window controllers are polled to provide their unique IDs and associated information. The results may be provided in a database, spreadsheet, or table with location information yet to be determined. By knowing the quantity and unique identifiers for a number of window controllers associated with a set of windows, each window also having a unique identifier, methods described herein allow for identifying which window controllers control which windows in the installation.

In some embodiments, during operation 302 physical information about the IGUs (e.g. window size, aspect ratio, etc.) may also be determined. This may be done by reading the information stored on a memory component of the IGU, in some cases in the pigtail (an electrical connection often used to power an IGU, which may include a memory component storing IGU information), or by associating the LiteID label stored on a memory component with a database (on the local machine or cloud based, for instance) which has the window information. This information can speed up the IGU discovery process as described below.

Next, at operation 304, each window controller is instructed to transition its associated window to one of several identifiable commissioning states. A commissioning state refers to an optical state of the electrochromic device that can be used to help associate a particular window with its associated window controller. In some embodiments, a commissioning state may be a single (relatively static) tint state. For instance, tint states such as "clear," "tint1," "tint2," etc. may each be used as commissioning states.

Figure 4:
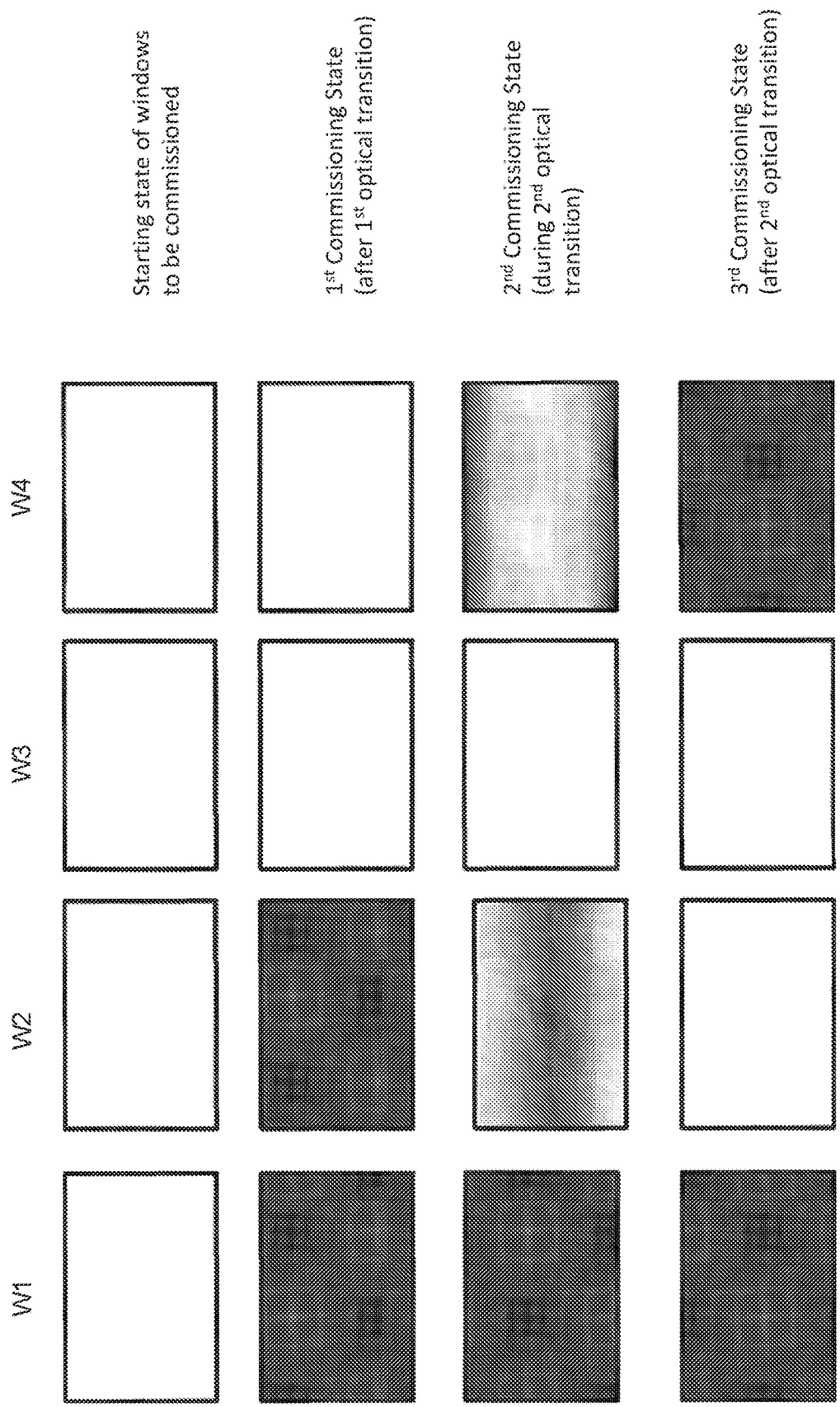
FIG. 4 illustrates a set of four electrochromic windows being commissioned, where the commissioning states include transitory tint states.

In some more complex embodiments, one or more commissioning states may relate to a (transitory) combination of two or more tint states. When an optical transition is initiated on an electrochromic device, the change in optical state originates near the edges of the device, close to the bus bars, then proceeds towards the center of the device. For example, when an electrochromic window is instructed to switch from clear to tinted, the edges of the device near the bus bars will become tinted first, and the center region of the device will become tinted last, as shown in FIG. 4, described further below. The optical state of the device can be monitored throughout the optical transition to provide information about both the starting and ending optical states of the transition. The path-dependent nature of the optical state of the device provides additional information compared to a static tint state, and this additional information can be used to further distinguish the windows from one another. Once the windows have completed the transition and reached steady state, the center-to-edge gradients disappear and the additional information related to the path-dependent nature of the transition is lost. Thus, time sensitive/transitory commissioning states can be used, which will speed up the commissioning process if the optical viewings can be done while the windows are in transition. In certain embodiments, while the window is in transition, the controller changes the voltage to reduce the current down to ~0 which "freezes" the visual state of the window, substantially increasing the time that the user has to view the windows in the time sensitive/transitory commissioning states.

In another embodiment, the number of distinguishable commissioning states may be effectively increased by performing a particular kind of transition after a tint state is reached. For example, the speed at which a window clears (or tints) may distinguish it from other windows that started at the same static tint state. Two windows that were both fully tinted may be distinguished if one is instructed to perform a fast clear and the other is instructed to perform a slow clear (or no clear). Essentially, the parameters used to define an optical transition can be used in addition to the static tint states to more effectively distinguish the windows from one another.

In certain embodiments the user may be asked by the algorithm whether they would prefer to use time sensitive/transitory commissioning states, as opposed to static commissioning states. In certain embodiments the use of time sensitive/transitory commissioning states is pre-defined. In certain embodiments the algorithm plans to use the time sensitive/transitory commissioning states, but if the user is not able to view the windows while they are in transition, and certain time passes, the algorithm determines that the transition is complete and options for selecting time sensitive/transitory commissioning states may be disabled, and subsequent window tinting/commissioning states are adjusted accordingly.

In an alternative embodiment, only one or a few window controllers are instructed in each pass through the commissioning process. Any number of different commissioning states can be used, as long as they are readily distinguishable from one another (e.g., by human eye, or by a detector). In one example, three different tint states are used for the commissioning states: (1) clear, (2) moderately tinted, and (3) fully tinted. A non-limiting example of three tint states would be: (1) between about 50% and about 70% transmission, (2) between about 6% and about 30% transmission and (3) between about 0.5% and about 2% transmission. In another example, four different tint states are used as the commissioning states: (1) clear, (2) slightly tinted, (3) moderately tinted, and (4) fully tinted. A non-limiting example of four tint states would be: (1) between about 50% and about 70% transmission, (2) between about 20% and about 40% transmission, (3) between about 6% and about 15% transmission and (4) between about 0.5% and about 2% transmission. As used herein, the terms "tint0," "tint1," etc. can correspond to any desired tint states, as long as the electrochromic windows are capable of achieving such states and the states are distinguishable, either by the human eye or by a detector, e.g., a photometer, light sensor and the like. In cases where the windows transition between states other than clear and tinted (e.g., where the window transitions between being reflective and non-reflective, etc.) these states may be used in place of tint states.

During operation 304, the instructions should differ between the individual window controllers to the extent possible based on the number of distinguishable commissioning states available. For example, where a network includes 3 electrochromic windows (and associated window controllers), each capable of transitioning to 3 distinguishable commissioning states (referred to as tint1, tint2, and tint3), operation 304 may involve instructing the first window controller to transition its associated window to tint1, instructing the second window controller to transition its associated window to tint2, and instructing the third window controller to transition its associated window to tint3. These instructions may be made simultaneously such that the windows tint (or clear) simultaneously. When relatively few unique commissioning states or other indicia are employed, a correspondingly low number of windows may be triggered in any given pass through the commissioning procedure (e.g., operations 304, 306, and 308), though this is not always the case. For example, for bistate windows having only two states, a clear and a tinted state, several iterations of 304 and 306 may be performed in order to identify individual windows using the iterative tint patterns (e.g., using deconvolution methods). If other window controllers must be located, these may be handled in subsequent iterations or they may be located at the same time as the initial window controllers, but using more sophisticated tinting/commissioning instructions as described below. Even if few commissioning states or other indicia are used, all of the windows may be simultaneously tinted, with additional iterations being used to eventually distinguish all the window controllers from one another, as described herein.

Next, at operation 306, the commissioning state of each window is recorded. This may be done manually or electronically. In some cases, a commissioning program (which may run on an electronic device such as a computer, tablet, smartphone, etc.) may be used. Details related to such a program are discussed further herein. In cases where the commissioning states are all static tint states, the recording may be done after the transitions are complete. In cases where one or more commissioning states relates to a transitory combination of starting optical state and ending optical state (e.g., as described in relation to FIG. 4, below), the recording may (also) be done while the transitions are ongoing (e.g., to glean the additional path-dependent information mentioned herein).

At operation 308, it is determined whether the windows are identifiable as being associated with a particular controller, for example based on the instructions sent in operation 304 and the commissioning states recorded in operation 306. If the relationship between each window and its associated window controller is identifiable, the method continues with operation 310, described further below. If the relationships between the windows and their associated controllers is not yet identifiable (e.g., where there are multiple windows that have received/displayed the same series of commissioning states, such windows not being controlled by the same window controller), the method repeats starting with operation 304 where the window controllers are instructed to transition their associated windows to another identifiable commissioning state.

Whether or not the windows are identifiable with their associated window controllers depends on the number of windows being commissioned and the number of distinguishable commissioning states available. In the example above with 3 windows and 3 distinguishable tint states (used as the commissioning states), only one iteration of operations 304/306 may be used. In a similar example with 6 windows and 3 identifiable tint states (used as the commissioning states), two iterations of operations 304/306 may be used. The minimum number of iterations of operations 304/306 may be calculated as follows:

$$\text{Minimum Iterations} = \left(\frac{\ln(N_w)}{\ln(t_{levels})}\right) \text{ rounded up to the next integer} \quad \text{Equation 1}$$

Where:
$N_w$=the number of windows being analyzed, and
$t_{levels}$=the number of distinguishable commissioning states available In another example, a network includes 90 electrochromic windows capable of four distinguishable commissioning states. In this case, the minimum number of iterations for uniquely identifying the windows is $(\ln(90)/\ln(4))=3.2$, which rounds up to 4.

Similarly, the maximum number of windows that can be analyzed in a given number of steps using a given number of distinguishable commissioning states may be calculated as follows:

$$\text{Maximum Number of Windows Analyzed} = t_{levels}^{steps} \quad \text{Equation 2}$$

Where:
$t_{levels}$=the number of distinguishable commissioning states available, and
steps=the number of commissioning state instruction/recordation iterations For example, where 3 distinguishable commissioning states are available and 4 iterations are performed, the maximum number of windows that can be simultaneously analyzed/commissioned is $3^4=81$. In some cases, it may be beneficial to ensure that each window receives at least one command to tint the window to some degree. In other words, it may be beneficial to ensure that no single window receives only "clear" tint state instructions. In this way, the commissioning process may double as a testing procedure to ensure that all of the electrochromic windows are functioning. In such cases, the maximum number of windows analyzed may be one less than the number calculated above (to exclude the "nothing but clear tint states" pattern).

At operation 310, the window controllers are associated with the windows/locations based on the pattern of commissioning state instructions sent during operation 304 and the commissioning states observed/recorded in operation 306. For example, a particular controller that instructed its associated window to transition (in order) to tint4/tint1/tint 4 can be matched with the window/location where such a pattern of tint states/commissioning states was observed. This association is described in further detail in relation to FIG. 3B.

Figure 3B:
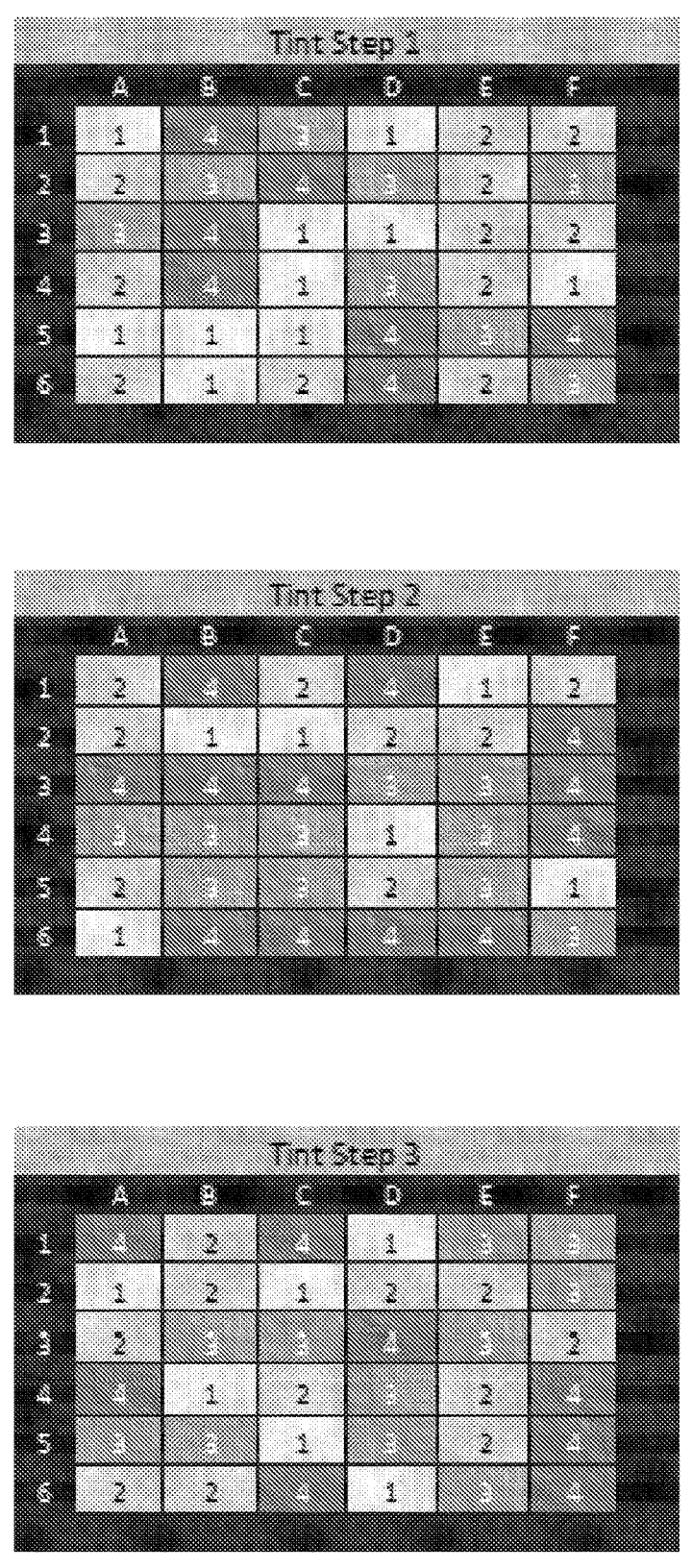

FIG. 3B illustrates three iterations of operations 304/306 from FIG. 3A in the context of a curtain wall having 6 rows (1-6) and 6 columns (A-F) of electrochromic windows, for 36 total windows. In this example, four distinguishable tint states are used, labeled 1-4. As such, the minimum number of iterations for distinguishing/identifying all of the windows/window controllers is $(\ln(36)/\ln(4))=2.6$, which rounds up to 3.

In the first iteration (labeled Tint Step 1), each of the window controllers instructs its associated window to transition to one of the 4 distinguishable tint states, as shown. As shown in FIG. 3B, window A1 transitions to tint state 1, for example, while window E2 transitions to tint state 2. The actual assignment of tint states to windows does not matter as long as the pattern of tint states (or other commissioning states) used over the course of the method allows for the relationships between the windows and their associated window controllers to be identified.

In the second iteration (labeled Tint Step 2), each of the window controllers instructs its associated window to transition to one of the 4 distinguishable tint states, where the set of instructions provided in the second iteration differs from the set of instructions provided in the first iteration. Some windows may receive the same tint command in the second iteration as the first iteration. However, at least some of the windows will receive an instruction to transition the window to a different tint state in the second iteration compared to the first iteration. For example, window A1 is instructed to transition to tint1 in the first iteration and tint2 in the second iteration, while window E2 is instructed to transition to tint2 in both the first and second iteration. After the second iteration, many of the windows can be distinguished from one another, but not all of the windows can be uniquely identified. For example, windows A1 and A5 are both at tint1 during the first iteration and tint2 during the second iteration. Thus, a third iteration may be used.

In the third iteration (labeled Tint Step 3), each of the window controllers instructs its associated window to transition to one of the 4 distinguishable tint states, where the set of instructions provided in the third iteration differs from the set of instructions provided in the first and second iterations. This third iteration, in combination with the first two, allows for all of the windows to be uniquely identified. For example, windows A1 and A5 can now be distinguished because window A1 is at tint4 and window A5 is at tint3. The sequence of tint states (or other optical states) experienced by an electrochromic window during this commissioning process may be referred to as the tint pattern for the electrochromic window.

In another example, each window or window controller being commissioned may be assigned a distinct number, and a series of commissioning states unique to the window or window controller may be defined for each window or window controller. The series of commissioning states may be defined based on the assigned number, or it may be randomly generated. This embodiment is discussed further in the context of FIGS. 3C-3E. Although the electrochromic windows are divided into four different sub-groups in the example of FIGS. 3C-3E, such grouping is not necessary. In some embodiments, the method described in relation to FIGS. 3C-3E may be performed on an entire group of windows, without any need to divide the windows into sub-groups. The group may include all of the electrochromic windows being commissioned. In such embodiments, the method is essentially the same as described in relation to FIGS. 3C-3E, except no sub-groups are defined, and the number assigned to each window or window controller is unique (i.e., the numbers do not repeat between different sub-groups, as there are no sub-groups).

The examples described in relation to FIGS. 3A and 3B assume that each window controller controls a single associated electrochromic window. However, this is not always the case. In some installations, a single window controller may control more than one electrochromic window. For example, two, three, four, or more electrochromic windows may be controlled by a single window controller. The windows controlled by a single window controller may exhibit the same tinting behavior, since the window controller may provide a single set of instructions that is applied to each of the associated electrochromic windows. Where this is the case, it may not be possible to uniquely identify each of the electrochromic windows based solely on the displayed tint patterns (e.g., because the windows associated with a particular controller may always display the same tint state/behavior). However, the relationship between each window controller and each of its associated electrochromic windows can still be identified.

In one example, a set of 16 electrochromic windows is controlled by 4 window controllers that each control 4 associated electrochromic windows. By following the methods described herein (e.g., the method of FIG. 3A, or another method described herein), it can be determined which windows are associated with each window controller. For example, if two distinguishable optical states are available, it would take two iterations of the method of FIG. 3A to determine which window controller each electrochromic window is associated with. Instead of repeating the method until each individual window is uniquely identifiable, the method is repeated until the relationship between each window and an associated window controller is identifiable.

Where individual window controllers are associated with multiple electrochromic windows, the methods are essentially the same as those described above, except that at the end of the method, the windows controlled by the same window controller may not be distinguishable from one another. Since all of these windows are controlled by the same window controller, it is not necessary to make any further distinction between the electrochromic windows.

In certain implementations where a single window controller controls multiple associated electrochromic windows, the program/application used to facilitate the commissioning process may be configured to allow several electrochromic windows to be associated with a single window controller. By contrast, in cases where only a single electrochromic window is associated with each window controller, this same condition may be treated as a user entry error (e.g., the program may determine that a user has made an error when entering the optical states of the windows if two windows show the same series of tint states). In some embodiments, if it is determined that two or more electrochromic windows have displayed the same series of tint states, the program/application may prompt the user to confirm that the relevant windows are controlled by the same window controller. Similarly, the program/application may provide the user with the opportunity to correct their tint state entries, and/or provide the user with the opportunity to observe an additional transition for the relevant windows to determine whether or not the windows are indeed associated with a single window controller.

Returning to the embodiment of FIG. 4, some additional context will be provided. FIG. 4 illustrates four windows (W1-W4) which are each capable of achieving two distinct tint states (clear and tinted), but more than two distinct commissioning states. During commissioning, each window experiences three commissioning states after an initial starting state. At the initial starting state (row 1 in FIG. 4), each of the windows is in a clear state. At the first commissioning state (row 2), windows W1 and W2 are tinted and windows W3 and W4 are clear. The second commissioning state (row 3) is measured/recorded during a time when windows W2 and W4 are actively transitioning. At this time, window W1 remains tinted, window W2 is transitioning from tinted to clear (which is apparent because the edges are lighter than the center of the device), window W3 remains clear, and window W4 is transitioning from clear to tinted (apparent because the edges are darker than the center of the device). Further, at this time, all four windows W1-W4 can be uniquely identified based on the instant commissioning states, even though the windows used only two static tint states, which typically would have allowed unique identification of only two windows (unless/until additional tinting instructions are provided). The use of dynamic/transitory tint states as commissioning states can significantly increase the number of windows that can be simultaneously commissioned with a given number of tinting instructions.

If the user views the windows while the windows are in the second commissioning state (row 3 of FIG. 4), viewing the windows in the $1^{st}$ or $3^{rd}$ commissioning states is not required. This is because, as noted above, the windows are uniquely identifiable when in the second commissioning state, which allows for the association between each window and its associated window controller to be identified. However, in case the user is unable to complete observations of all the windows while the windows are in the $2^{nd}$ commissioning state (e.g., due to the transitory nature of certain commissioning states), he/she can still view the third commissioning state and gain information about the window identification. In some embodiments, the commissioning method may involve dynamically adjusting the next commissioning state for each window (or a subset of the windows) based on the results obtained/recorded during an initial part of the commissioning method. For example, if a transitory commissioning state was planned for/executed, but the user was not able to view or record the transitory commissioning state for one or more of the windows, the information related to the unrecorded transitory commissioning state is lost. In response, the next set of instructions for tinting the windows may be modified to enable the optimal identification of all windows based on the all the information available at that point in time.

The third commissioning state (row 4) is recorded after the optical transition is complete. At this time, window W1 is still tinted, window W2 is clear, window W3 is still clear, and window W4 is tinted. Each window has experienced a unique combination of commissioning states, and as such, the relationships between each window and its associated window controller can be identified. However, as mentioned above, it may not be necessary to wait until this third commissioning state is achieved, at least because the relationship between each window and its associated window controller can be determined solely based on the second commissioning state for this example.

In certain embodiments, the size and aspect ratio of the windows can be used to divide the windows to identified into sub-groups. Dividing the windows into sub-groups may be useful since it potentially can reduce the number of iterations required to identify the relationship between each window and its associated window controller. With reference to Equation 1 above, $N_w$ may refer to the number of windows in the largest sub-group rather than the number of windows in the full façade. The number of sub-groups (and relatedly, the number of windows in each sub-group) can be decided before the IGU identification process starts. A non-limiting example could be to define the sub-groups as windows with Area<10 ft$^2$ (small windows), 10 ft$^2$<Area<30 ft$^2$ (medium windows), and Area>30 ft$^2$ (large windows). Another non-limiting example could be to define the sub-groups based on the aspect ratio of the individual windows, with aspect ratio<1.1 ('square' windows), and aspect ratio>1.2 ('rectangular' windows). Another example could be to define the sub-groups based on size and aspect ratio (e.g., small square, small rectangle, medium square, medium rectangle etc). The binning thresholds for size, aspect ratio (or other features) can be determined based on the window sizes present in the specific façade being commissioned. For instance, for a façade with a mix of 10-12 ft$^2$ and 28-30 ft$^2$ windows the threshold between small and medium size windows could be set at 15 ft$^2$. The sub-grouping rules should be chosen to minimize the number of windows in the largest sub-group (i.e., $N_w$), not necessarily try to divide the windows into the most uniform sub-groups. For example, if there are 60 windows in a façade and 3 commissioning states are possible, it is beneficial to divide the façade into a grouping of say {27, 27, 6} instead of say {30, 15,15}, as the first grouping scheme will now require one fewer tint iteration to identify the windows.

As mentioned, the windows may be split into groups of windows, with a different tint pattern (or other series of commissioning states) sent to each window in the group. In some cases, the window controllers/windows may be initially mapped to their desired locations, though such mapping may be unconfirmed in practice. In other words, an installer may have a map of where each window controller/window should be, but this map may not correspond to where the window controllers/windows were actually installed. The mapping is not required. The windows may be provided in a curtain window/façade in some cases. The grouping may be determined based on a perceived potential for mis-wiring in some cases. For example, if it is assumed that the windows are no more than 1 position away (e.g., in a row or column) in any direction from their mapped locations, the windows may be divided into subsets of 3×3 windows (9 windows in each group). If it is assumed that the windows are no more than 2 positions away from their mapped locations, the windows may be divided into subsets of 5×5 windows (25 windows in each group). If it is assumed that the windows may be more than 2 positions away, larger groups of windows may be used.

In certain embodiments, within each group of windows/window controllers, the windows or window controllers may be assigned a distinct number (e.g., window 0, window 1 . . . window N-1, where N is the number of windows in the group). As mentioned above, this embodiment may also be practiced on a single large group of windows that is not split into smaller sub-groups. FIG. 3C presents one example of a 6×6 façade of windows (36 total windows) that is divided into four groups of 3×3 windows (9 windows in each group). FIG. 3D illustrates the numbers that are assigned within each group. The patterns (e.g., number assignments) within each group are chosen to prevent aliasing across different rows/columns between groups. Because each group includes 9 windows, the windows (or window controllers) in each group are assigned a number between 0-8, as shown in FIG. 3D. The number assigned to each window (or window controller) corresponds to a particular tint pattern (or other series of commissioning states). The tint pattern (or other series of commissioning states) for a particular number may be randomly generated, or it may be generated based on a particular method. In one example, the number assigned to an individual window (or window controller) is mapped to a tint pattern based solely on the window number (or window controller number). For instance, assuming that three distinguishable tint states (or other commissioning states) are available, the number may be converted into base three. The resulting converted number may be directly mapped to the available tint states (or other commissioning states). In some cases, each digit in the converted number may represent a tint state (or other commissioning state) that the window is instructed to achieve, with the tint states (or other commissioning states) being achieved in the order of the digits. The tint pattern (or other series of commissioning states) for a particular window is therefore defined by the converted number. In cases where the converted number has fewer digits than other converted numbers, additional zeros may be provided before the first digit (see windows A1-C1 in FIG. 3E, for example).

FIG. 3E presents the window façade of FIGS. 3C and 3D, with the window number from FIG. 3D converted into base 3. Each digit in the converted number corresponds to a tint state, with 0 being tint0, 1 being tint1, and 2 being tint2. Transitory commissioning states (e.g., as described in relation to FIG. 4) are not used in this example, though they could be. In this embodiment, window A1 is designated "00" and therefore the tint pattern displayed on this window will be tint0, followed by tint0 (there may or may not be a clear between these). Window A2 is designated "10" and therefore the tint pattern displayed on this window will be tint1, followed by tint0. The tint1 state corresponds to the first digit (1), and the tint0 state corresponds to the second digit (0). Similarly, window C3 is designated "22" and the tint pattern displayed on this window will be tint2, followed by tint2. As noted, the patterns may also be randomly generated, so long as it can be determined which window controller is sending which pattern of tint states. Each set of tint states (or other commissioning states) among the windows may be recorded for the purpose of matching up the window pattern instructions with the observed tint states/commissioning states. In some cases, a program may be used to verify whether each window controller lines up with its expected position. The program may compare the instructions sent by each window to the observed series of commissioning states to identify any mismatched window controllers. In some cases, the windows may have no expected position, and the method may be repeated as many times as needed to distinguish the various windows. If there is any doubt about the location of a window controller or set of window controllers after the tint patterns are recorded (e.g., if it is necessary to distinguish between similarly numbered windows/window controllers, for example the window controllers associated with windows A1 and F3, which will display the same tint pattern, as shown in FIG. 3E), the method can be repeated using the subset of windows to be distinguished.

Figure 5A:
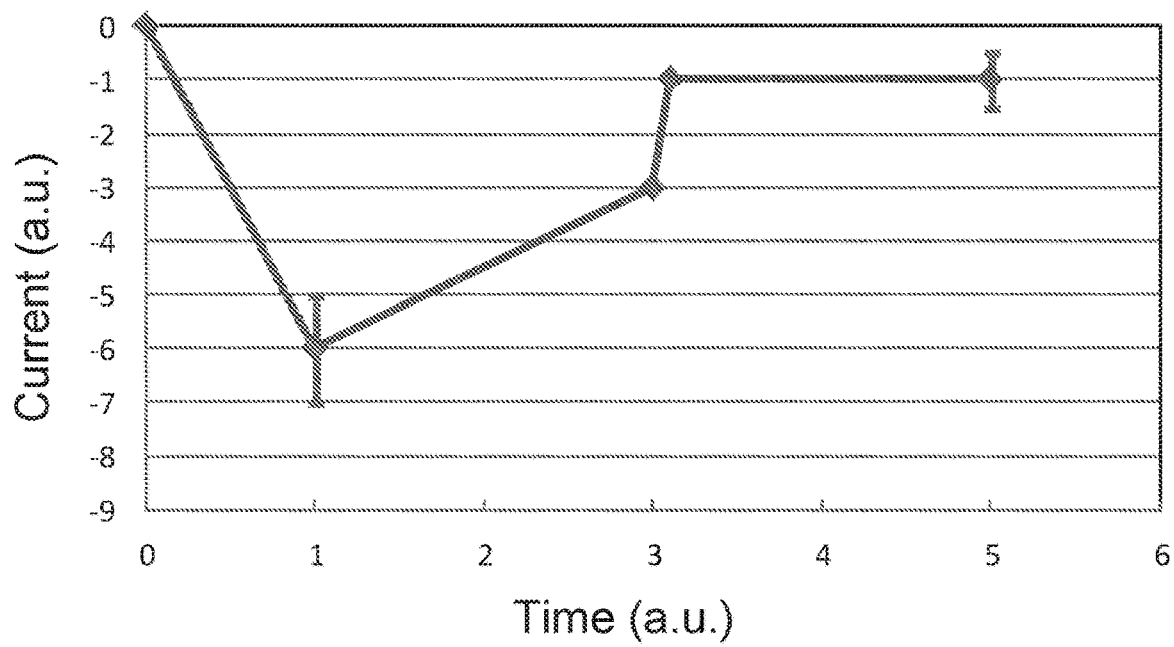
FIGS. 5A and 5B present current vs. time plots related to a method for ensuring the validity of the determined associations between the electrochromic windows and their associated window controllers.

In some embodiments, after the identification of the windows is complete, the current and/or voltage data collected by the controller may be compared against the range of expected values to confirm that the mapping of the windows and their associated window controllers is correct. For example, FIG. 5A shows a simplified version of a current vs. time plot for a controller driving a clear state to tinted state transition. The current magnitude shows a big initial increase (t=1) when the window starts transitioning. This is called the peak current. The magnitude of the current then reduces gradually over time (1<t<3), and then drops more substantially (t=3) when the window has substantially completed the optical transition and the voltage applied to the window is reduced. After a certain amount of time, the window reaches steady state and the current stabilizes (t=5). This is called the leakage current.

The leakage current is a function of the net area of the windows hooked up to the given controller, as well as the intrinsic properties of the EC window. Similarly, the peak current drawn during a specific optical transition (e.g., Tint1→Tint4) is a function of the distance between bus bars, the number of windows hooked up to a particular controller, and the intrinsic EC window properties. FIG. 5A also shows an example of specified limits defined for the peak current and leakage current. These limits are presented as error bars in FIG. 5A, at t=1 and t=5.

Figure 5B:
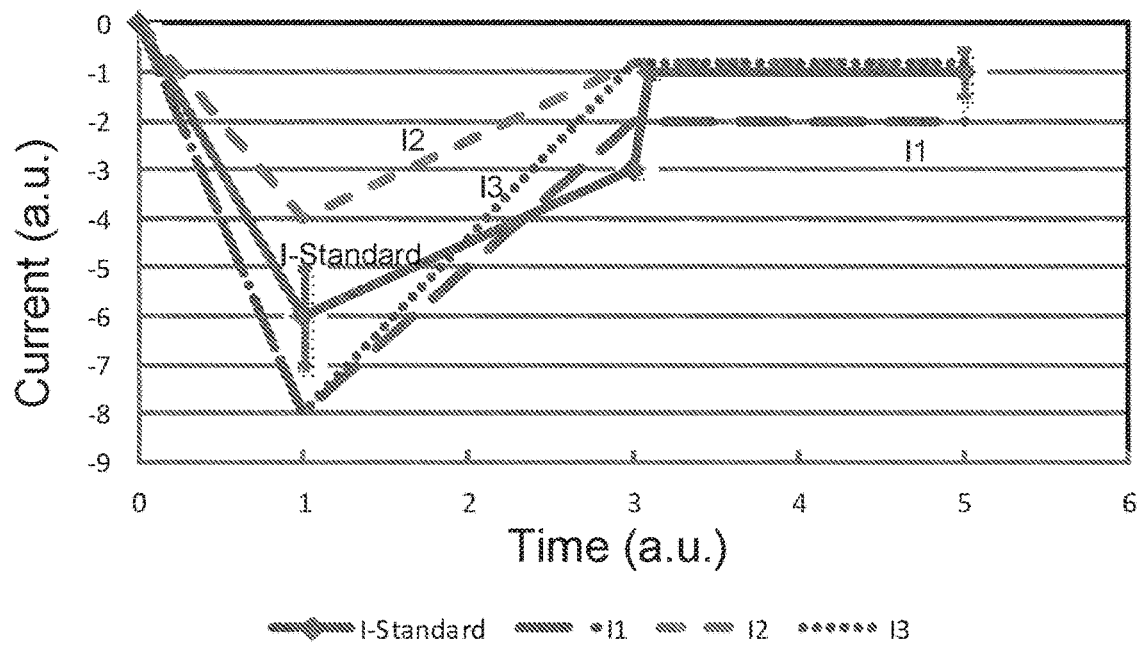

FIG. 5B shows simplified current vs. time data for three other windows (I1, I2, I3) superimposed against the "standard" window data presented in FIG. 5A. It can be seen that I1 has out of spec (higher magnitude) peak current and leakage current. A non-limiting example of when this scenario might occur is if the number of units physically hooked up to the given controller exceeds the expected number of windows based on the planned installation. Similarly, for windows I2 and I3, the peak current is out of spec (higher magnitude) but the leakage current is in-spec. A non-limiting example of when this scenario might occur is if the controller is hooked up to an incorrect window which has a different aspect ratio compared to the expected/correct window. Similar checks can also be defined which look at the expected/actual voltage instead of current. This type of a check can be useful to catch a potential error made by the user in entering his/her visual observation of the windows.

As mentioned in relation to various commissioning methods, a program or application may be used to facilitate the commissioning process. The program may include image processing software, and may be configured to perform a variety of operations as described herein. In a number of embodiments, the program may be configured to analyze photographs and/or videos to identify (1) where window openings (the locations where windows are installed) are positioned, and (2) tint levels/tint patterns/light patterns/other visually identifying information transmitted from a window that has been triggered. For instance, the program may be configured to analyze a photograph of a curtain wall including 6×6 windows (36 windows total) to determine the position and tint state of each individual window in the curtain wall. In another example, the program may be configured to analyze a video of a curtain wall to determine the tint state of each window in the curtain wall over time. In a similar example, the program may be configured to analyze a video of a curtain wall to determine the light pattern displayed over time by an LED or other light on each window in the curtain wall. The resulting analyses can be compared against the instructions sent by each window controller to determine which window controller is connected with which window.

The program may also be configured to capture the photographs and/or videos. In other cases, the program may utilize photographs or videos that are otherwise provided to the program. In some cases, the program may be configured to stitch together multiple photographs into a single photograph. This may be useful in cases where an entire group of windows cannot be photographed in a single shot. The program may be configured to compensate for changing light levels such that images taken at a first time can be accurately compared with images taken at a second time under different lighting conditions. In some cases the program may be configured to match the identified window openings with particular windows on a building map/schematic. The program may also be configured to allow for a user to manually override determinations that are made by the program. For instance, the program may incorrectly determine that a window is in a first tint state. In response, a user may identify the relevant window and override the tint state determination such that the program knows the correct tint state of the window. This feature may be implemented in a number of ways, including but not limited to having a user select the relevant window from a list, map, photograph, video, or other visual representation of the windows. The program may also be configured to direct the window controllers to cause the windows to identify themselves. For instance, the program may be used to instruct each window controller to cause an LED on each window to display a unique light pattern. The light patterns may be determined by the program. Similarly, the program may be used to instruct each window controller to cause its associated window to transition to a particular tint state (or pattern of tint states). The tint states and patterns may be determined by the program.

Certain patents and patent applications are incorporated by reference herein. It is understood that any disclaimers or disavowals made in such patents and patent applications do not necessarily apply to the present application. Moreover, any features that are described as necessary (or similar language) may or may not be used in the embodiments of the present application.

Additional details related to a controller, various components therein, and particular control methods are further described in P.C.T. Patent Application No. PCT/US14/43514, which is herein incorporated by reference in its entirety.

Although the foregoing embodiments have been described in some detail to facilitate understanding, the described embodiments are to be considered illustrative and not limiting. It will be apparent to one of ordinary skill in the art that certain changes and modifications can be practiced within the scope of the appended claims.

What is claimed is:

1. A method of determining associations between window controllers and associated electrochromic windows installed in a network, the method comprising:
   (a) providing instructions to each window controller to transition its associated electrochromic window(s) to a commissioning state, wherein the commissioning state varies between electrochromic windows associated with different window controllers;
   (b) after (a), recording the commissioning states of the electrochromic windows;
   (c) repeating (a) and (b) at least once such that each electrochromic window experiences a series of commissioning states, wherein the instructions provided to the window controllers provide a unique series of commissioning states for each window controller being commissioned; and
   (d) determining the association between the window controllers and their associated electrochromic windows by comparing the instructions provided in each iteration of (a) with the commissioning states observed in each iteration of (b).

2. The method of claim 1, wherein the series of commissioning states comprises three or more different tint states.

3. The method of claim 2, wherein the series of commissioning states comprises four or more different tint states.

4. The method of claim 1, wherein the series of commissioning states comprises two or more different static tint states and one or more transitory tint states.

5. The method of claim 1, wherein (b) comprises taking a photograph or video of the electrochromic windows.

6. The method of claim 5, further comprising processing the photograph or video using a program comprising image processing software to determine the commissioning states of the electrochromic windows.

7. The method of claim 6, further comprising manually overriding a commissioning state determination made by the program to correct the commissioning state of an electrochromic window whose commissioning state was incorrectly determined by the program.

8. The method of claim 6, wherein the program is configured to match a set of electrochromic windows in a first photograph with the same set of electrochromic windows in a second photograph, the first and second photographs being taken at different times.

9. The method of claim 1, wherein determining the association between the window controllers and their associated electrochromic windows comprises determining which window controller is connected with which electrochromic window(s).

10. The method of claim 1, wherein the network of electrochromic windows comprises two or more groups of electrochromic windows, and wherein the method of claim 1 is performed simultaneously on each group of the two or more groups of electrochromic windows.

11. The method of claim 1, further comprising collecting current and/or voltage data corresponding to the current and/or voltage experienced by the electrochromic windows during an optical transition, and comparing the collected current and/or voltage data to expected current and/or voltage data to thereby confirm the associations determined in (d) between the window controllers and their associated electrochromic windows.

12. The method of claim 1, wherein the window controllers simultaneously transition their associated electrochromic window(s).

13. A method of determining associations between window controllers and associated electrochromic windows installed in a network, each electrochromic window comprising a light, the method comprising:
   (a) providing instructions to each window controller to display a light pattern on the light of the window controller's associated electrochromic window(s), wherein the light patterns are unique for each of the window controllers;
   (b) recording the light patterns displayed on the lights of the electrochromic windows; and
   (c) determining the association between the window controllers and their associated electrochromic windows by comparing the instructions provided in (a) with the light patterns observed in (b).

14. The method of claim 13, wherein the lights comprise light emitting diodes (LEDs).

15. The method of claim 13, wherein (b) comprises taking a photograph or a video of the electrochromic windows.

16. The method of claim 15, further comprising processing the photograph or the video using a program comprising image processing software to determine the light pattern displayed by the lights of the electrochromic windows.

17. The method of claim 13, wherein determining the association between the window controllers and their associated electrochromic windows comprises determining which window controller is connected with which electrochromic window.

18. The method of claim 13, wherein the network of electrochromic windows comprises two or more groups of electrochromic windows, and wherein the method of claim 13 is performed simultaneously on each group of the two or more groups of electrochromic windows.

19. The method of claim 13, wherein the light patterns are simultaneously displayed on the lights of the electrochromic windows.

20. The method of claim 13, wherein the electrochromic windows are provided in IGUs, each IGU comprising at least two panes, wherein the lights of the electrochromic windows are provided between the panes of the IGUs.

21. The method of claim 20, wherein each IGU comprises a spacer, and wherein the lights of the electrochromic windows are provided flush with the spacers.

22. The method of claim 13, wherein each electrochromic window comprises a pane, and wherein the lights of the electrochromic windows are provided on the panes of the electrochromic windows.

23. The method of claim 22, wherein the electrochromic windows are provided in IGUs, each IGU comprising at least two panes and an interior region defined between the two panes, wherein the lights of the electrochromic windows are provided outside of the interior region of the IGUs.

24. The method of claim 13, wherein the lights of the electrochromic windows are provided in a viewable area of the electrochromic windows.

* * * * *